(12) United States Patent
Takeda et al.

(10) Patent No.: US 11,388,741 B2
(45) Date of Patent: Jul. 12, 2022

(54) TERMINAL, RADIO COMMUNICATION METHOD, BASE STATION, AND SYSTEM FOR DOWNLINK SHARED CHANNEL DECODING

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/056,914

(22) PCT Filed: May 21, 2018

(86) PCT No.: PCT/JP2018/019499
§ 371 (c)(1),
(2) Date: Nov. 19, 2020

(87) PCT Pub. No.: WO2019/224875
PCT Pub. Date: Nov. 28, 2019

(65) Prior Publication Data
US 2021/0204308 A1    Jul. 1, 2021

(51) Int. Cl.
*H04W 72/12* (2009.01)
*H04L 1/18* (2006.01)
(Continued)

(52) U.S. Cl.
CPC ....... *H04W 72/1273* (2013.01); *H04L 1/0061* (2013.01); *H04L 1/1819* (2013.01);
(Continued)

(58) Field of Classification Search
CPC ......... H04W 72/1273; H04W 72/1278; H04W 72/1289; H04W 72/1263; H04L 1/0061; H04L 1/1819; H04L 5/0098
See application file for complete search history.

(56) References Cited

U.S. PATENT DOCUMENTS

2015/0270868 A1* 9/2015 Park .................... H04B 1/7143
370/329
2016/0014752 A1* 1/2016 Papasakellariou .... H04L 5/0007
370/329
(Continued)

FOREIGN PATENT DOCUMENTS

EP         3179659 A2    6/2017
WO     2017/195479 A1    11/2017

OTHER PUBLICATIONS

International Search Report issued in Application No. PCT/JP2018/019499, dated Aug. 7, 2018 (7 pages).
(Continued)

*Primary Examiner* — Kent Krueger
(74) *Attorney, Agent, or Firm* — Osha Bergman Watanabe & Burton LLP

(57) ABSTRACT

According to an aspect of the present disclosure, a user terminal includes a receiving section that receives a downlink shared channel, and a control section that controls monitoring of the downlink shared channel in a time domain resource and a frequency domain resource of a cycle configured by higher layer signaling.

14 Claims, 11 Drawing Sheets

(51) Int. Cl.
 *H04L 5/00* (2006.01)
 *H04L 1/00* (2006.01)
(52) U.S. Cl.
 CPC .......... *H04L 1/1896* (2013.01); *H04L 5/0098* (2013.01); *H04W 72/1289* (2013.01)

(56) References Cited

U.S. PATENT DOCUMENTS

| | | | |
|---|---|---|---|
| 2017/0171841 | A1 | 6/2017 | Chen et al. |
| 2019/0141742 | A1* | 5/2019 | Zhou ..................... H04W 24/08 |
| 2019/0254053 | A1* | 8/2019 | Ying ................... H04W 72/042 |
| 2019/0342907 | A1* | 11/2019 | Huang .................. H04L 5/0053 |
| 2019/0357215 | A1* | 11/2019 | Zhou ..................... H04L 5/0098 |
| 2019/0357238 | A1* | 11/2019 | Zhou ................. H04W 72/1257 |
| 2020/0021419 | A1* | 1/2020 | Taherzadeh Boroujeni ................ H04L 5/0091 |
| 2020/0337077 | A1* | 10/2020 | Yoshimura ............ H04L 1/1812 |
| 2021/0050961 | A1* | 2/2021 | Chen Larsson ....... H04L 1/1893 |

OTHER PUBLICATIONS

Written Opinion issued in International Application No. PCT/JP2018/019499, dated Aug. 7, 2018 (6 pages).

3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).

3GPP TSG-RAN WG1 #76; R1-140239; "On the need of PDCCH for SIB, RAR and Paging;" MediaTek Inc.; Feb. 10-14, 2014; Prague, Czech Republic (4 pages).

Extended European Search Report issued in European Application No. 18919657.9, dated Dec. 23, 2021 (9 pages).

* cited by examiner

FIG. 1A

| $\mu$ | Maximum number of PDCCH candidates per slot and per serving cell $M_{PDCCH}^{max,slot}$ |
|---|---|
| 0 | 44 |
| 1 | 36 |
| 2 | 22 |
| 3 | 20 |

FIG. 1B

| $\mu$ | Maximum number of non-overlapped CCEs per slot and per serving cell $C_{PDCCH}^{max,slot}$ |
|---|---|
| 0 | 56 |
| 1 | 56 |
| 2 | 48 |
| 3 | 32 |

TERMINAL, RADIO COMMUNICATION METHOD, BASE STATION, AND SYSTEM FOR DOWNLINK SHARED CHANNEL DECODING

TECHNICAL FIELD

The present disclosure relates to a user terminal in a next-generation mobile communication system.

BACKGROUND ART

In the universal mobile telecommunications system (UMTS) network, the specifications of a long-term evolution (LTE) have been drafted for the purpose of further increasing high speed data rates, providing low latency, and the like (see Non-Patent Literature 1). In addition, for the purpose of further widening the bandwidth and increasing the speed from the LTE (also referred to as LTE Rel. 8 or 9), the LTE advanced (LTE-A, also referred to as LTE Rel. 10, 11, or 12) has been specified, and the LTE succeeding system (for example, referred to as a future radio access (FRA), a 5th generation mobile communication system (5G), a new radio (NR), a new radio access (NX), a future generation radio access (FX), an LTE Rel. 13, 14, or 15 or later) is also being studied.

In the existing LTE system (for example, LTE Rel. 8 to 13), the user terminal (user equipment (UE)) controls reception of the downlink shared channel (for example, physical downlink shared channel (PDSCH)) based on downlink control information (DCI, also referred to as DL assignment, etc.) from the radio base station. Also, the user terminal controls transmission of the uplink shared channel (for example, physical uplink shared channel (PUSCH)) based on the DCI (also referred to as UL grant).

In addition, in the existing LTE system, one or more candidate resources (also referred to as PDCCH candidates, search space, etc.) of the downlink control channel (for example, physical downlink control channel (PDCCH)) at a given cycle (for example, 1 ms cycle) of the user terminal are monitored (blind decoded) to detect the downlink control information.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (for example, NR, 5G, 5G+, or Rel. 15 or later), support for communications (for example, ultra reliable and low latency communications (URLLC)) requiring ultra-high reliability and low latency is being studied.

For example, in the URLLC, it is also assumed that the PDCCH candidates are monitored (blind decoded) during one or more periods for monitoring (also referred to as a monitoring period, a monitoring occasion, etc.) within one slot.

However, when one or more monitoring periods are provided in one slot, there is a possibility that the number of the PDCCH candidates that the user terminal has to monitor may increase. On the other hand, when limiting the number of the PDCCH candidates monitored by the users terminal, there is a possibility that in at least one PDCCH candidate, collision (blocking) with the downlink control information of another user terminal may occur.

Therefore, it is an object of the present invention by the present inventors to provide a user terminal capable of reducing the probability of occurrence of blocking in the PDCCH candidates assigned to the user terminal when one or more monitoring periods are provided in one slot.

Solution to Problem

A user terminal according to an aspect of the present invention includes a receiving section that receives a downlink shared channel, and a control section that controls monitoring of the downlink shared channel in a time domain resource and a frequency domain resource of a cycle configured by higher layer signaling.

A user terminal according to an aspect of the present invention includes a receiving section that receives a downlink shared channel based on first downlink control information detected in a monitoring period of a given cycle, and a control section that controls reception of a downlink shared channel scheduled by a next monitoring period based on second downlink control information transmitted as a MAC control element via the downlink shared channel, or piggybacked on the downlink shared channel.

A user terminal according to an aspect of the present invention includes a receiving section that receives one piece of downlink control information detected in a monitoring period of a given cycle, and a control section that controls, based on information about a downlink shared channel included in the one piece of downlink control information, reception of the downlink shared channel, and that controls, based on information about an uplink shared channel included in the one piece of downlink control information, transmission of the uplink shared channel.

Advantageous Effects of Invention

According to an aspect of the present invention, when one or more monitoring periods are provided in one slot, it is possible to reduce the probability of occurrence of blocking in the PDCCH candidates assigned to the user terminal.

BRIEF DESCRIPTION OF DRAWINGS

FIGS. 1A and 1B are diagrams showing an example of the maximum number of the PDCCH candidates and the maximum number of non-overlapped CCEs monitored per slot per cell.

DESCRIPTION OF EMBODIMENTS

Figure 2:
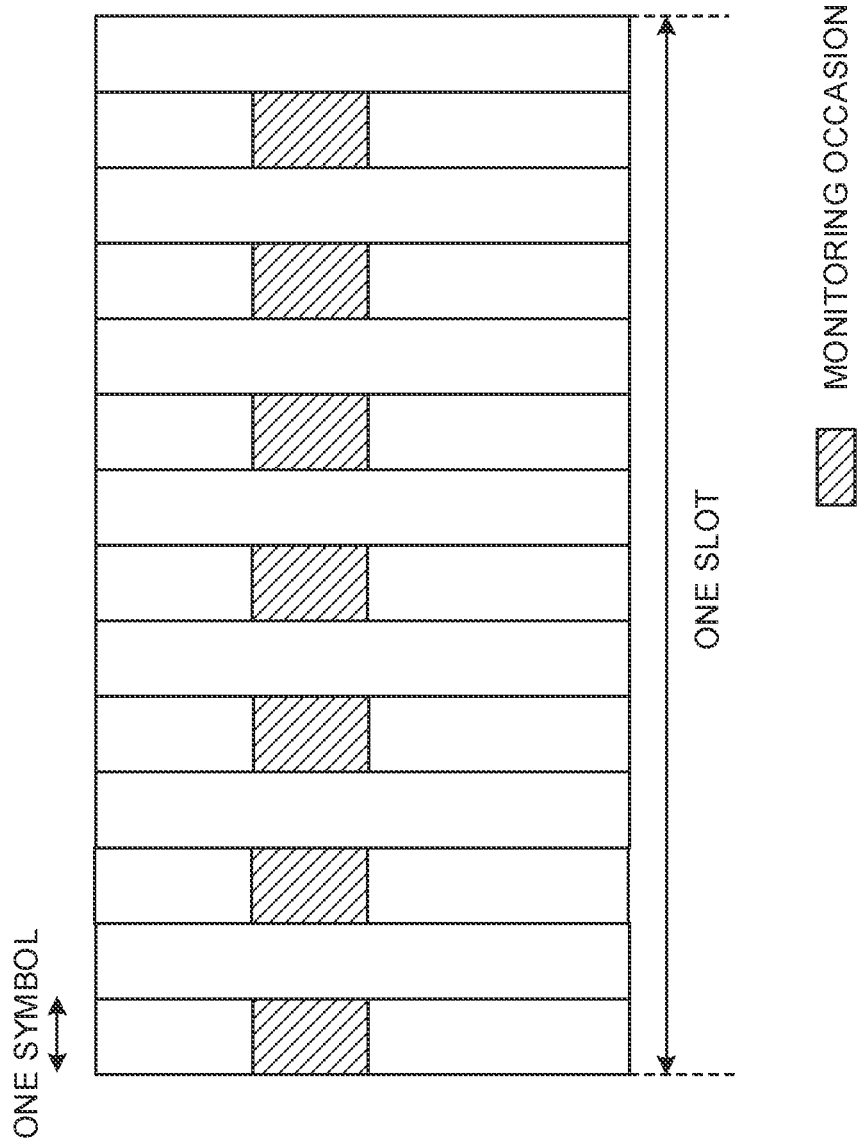
FIG. 2 is a diagram showing an example of monitoring the PDCCH candidates for URLCC.

In future radio communication systems (for example, NR, 5G, 5G+, and Rel. 15 or later versions), use of a control resource set (CORESET) is being studied in order to transmit a physical layer control signal (for example, downlink control information (DCI)) from a radio base station (which may be referred to as, for example, a base station (BS), a transmission/reception point (TRP), an eNodeB (eNB), an NR NodeB (gNB), or the like) to a user terminal.

The CORESET is an allocation candidate area of a downlink control channel (for example, a physical downlink control channel (PDCCH)). The CORESET may be configured to include the given frequency domain resource and the given time domain resource (for example, one or two OFDM symbols, and the like). The PDCCH (or DCI) is mapped to a given resource unit in the CORESET.

The given resource unit may be, for example, at least one of a control channel element (CCE), a CCE group including one or more CCEs, a resource element group (REG) including one or more resource elements (RE), one or more REG bundles (REG groups), and a physical resource block (PRB).

The user terminal monitors (blind decodes) the search space (SS) in the CORESET to detect the DCI for the user terminal.

In the future radio communication system, determining the downlink control channel (for example, PDCCH) candidates (also referred to as PDCCH candidates, downlink control channel candidates, etc.) monitored per slot in single cell (serving cell, carrier, component carrier (CC)) for each subcarrier interval (p) is being studied.

FIG. 1A shows the maximum number of the PDCCH candidates monitored per slot per cell at a subcarrier interval of $2^{\mu} \cdot 15$ kHz. In FIG. 1A, the subcarrier intervals when p=0, 1, 2, and 3 are 15, 30, 60, and 120 kHz, respectively.

For example, in FIG. 1A, the maximum number of the PDCCH candidates that is expected to be monitored per slot per cell may be indicated at all aggregation levels and in all DCI formats of different sizes within the same search space. The aggregation level is the integration number of given resource units (for example, CCE) to which the PDCCH is mapped.

FIG. 1B shows the maximum number of non-overlapped CCEs monitored per slot per cell at a subcarrier interval of $2^{\mu} \cdot 15$ kHz. In FIG. 1B, the subcarrier intervals when μ=0, 1, 2, and 3 are 15, 30, 60, and 120 kHz, respectively.

For example, in FIG. 1B, the maximum number of non-overlapped CCEs per cell and per slot may be indicated when the higher layer parameter (for example, monitoring-symbols-PDCCH-within-slot) indicates on the user terminal the monitoring occasion (monitoring period) of a single PDCCH in the slot.

Here, a plurality of CCEs non-overlaps when they correspond to at least one of the following:
 When the CORESET index is different
 When the first symbol for receiving the PDCCH candidates is different In the future radio communication system, support for communications (for example, ultra reliable and low latency communications (URLLC)) requiring ultra-high reliability and low latency is being studied. In the URLLC, it is expected that the PDCCH candidates will be monitored at one or more monitoring occasions within one slot.

FIG. 2 is a diagram illustrating an example of monitoring the PDCCH candidates for URLCC. In FIG. 2, for example, one slot is composed of 14 symbols and a monitoring occasion is provided for every two symbols. Note that FIG. 2 is merely an example, and the structure of the monitoring occasion is not limited to that illustrated.

As described in FIG. 1A, assuming that μ=0 (subcarrier interval=15 kHz), according to FIG. 1A, the maximum number of the PDCCH candidates monitored by the user terminal per slot is set to 44. As shown in FIG. 2, when the user terminal monitors the PDCCH candidates at each of seven monitoring occasions in one slot, the number of the PDCCH candidates monitored per monitoring occasion is limited to 6 (=44/7). Therefore, the radio base station is required to assign the DCI (for example, at least one of DL assignment and UL grant) for the user terminal to at least one of the six PDCCH candidates.

When the DCI of another user terminal is assigned to at least part of the six PDCCH candidates of each monitoring occasion of the user terminal, the DCI of the user terminal cannot be assigned (blocking occurs). Although it is conceivable to increase the number of the PDCCH candidates to be monitored at each monitoring occasion in order to reduce the probability of occurrence of such blocking, the processing load on the user terminal may increase when increasing the number of the PDCCH candidates.

Therefore, the present inventors have completed the present invention in which a method of reducing the probability of occurrence of blocking in the PDCCH candidates is studied while suppressing the number of the PDCCH candidates monitored per slot when one or more monitoring occasions (monitoring period) are provided in one slot.

Now, the present embodiment will be described below in detail with reference to the drawings.

(First Aspect)

In the first aspect, the PDSCH reception control (type 1 or type 2) using DL assignment (also referred to as configured DL assignment, DL assignment free, or the like) configured by higher layer signaling, and the PDSCH reception control (type 3) using two-stage DCI (first and second DCI, two-stage DCI) will be described. Note that the user terminal can also be used in combination with at least two of the types 1 to 3.

<Type 1>

In the type 1, the user terminal may control the PDSCH reception according to a parameter (higher layer parameter) configured by higher layer signaling. In the type 1, as in the UL the type 1 setting grant, the parameter related to DL assignment (for example, DCI formats 1_0 and 1_1) may be configured by higher layer signaling.

Here, the higher layer signaling may be implemented by, for example, radio resource control (RRC) signaling, broadcast information (for example, a master information block (MIB)), system information (for example, a system information block (SIB)), a medium access control (MAC) signaling, other signals, or a combination thereof.

For example, the user terminal may receive at least one higher layer parameter of the following:

Information (also referred to as retransmission RNTI information, cs-RNTI, etc.) indicating a given identifier (for example, new radio network temporary identifier (RNTI) or configured scheduling RNTI (CS-RNTI)) used for scrambling (CRC scramble) of cyclic redundancy check (CRC) bits included (added) in the DCI for scheduling the retransmitted PDSCH Information (also referred to as cycle information, periodicity, etc.) indicating the PDSCH transmission cycle Information (also referred to as offset information, timeDomainOffset, etc.) indicating the offset of the resource regarding the system frame number, which is zero, in the time domain Information (also referred to as time domain resource allocation information, timeDomainAllocation, time-DomainAllocation, etc.) about the time domain resource allocated to the PDSCH Information (HARQ process number information, nrof-HARQ-Processes) indicating the number of hybrid automatic repeat request (HARQ) processes for the PDSCH Information (also referred to as modulation and coding scheme (MCS) index, mcsAndTBS, etc.) about at least one of a PDSCH modulation system, a coding rate, and a transport block size (TBS)

Information (also referred to as frequency domain resource allocation information, frequencyDomainAllocation, frequencyDomainAllocation, etc.) about the frequency domain resource allocated to the PDSCH Information (DMRS information, DMRS-DownlinkConfig) about the PDSCH demodulation reference signal (DMRS)

The time domain resource allocation information may include information indicating at least one of a PDSCH start symbol (S) in a slot and the period (for example, a start and length indicator value (SLIV)).

Further, the cycle information may indicate, for example, 2, 7, 1×14, 2×14, 4×14, 5×14, 8×14 . . . or 5120×14 symbols.

The user terminal may control the PDSCH monitoring (blind decoding) for the first transmission without monitoring the DCI (PDCCH) based on the received at least one higher layer parameter. For example, the user terminal may blind decode the PDSCH in the time domain resource indicated by the time domain resource allocation information and the frequency domain resource indicated by the frequency domain resource allocation information.

Moreover, the user terminal may control reception of the retransmitted PDSCH based on the dynamic DCI. The DCI may be CRC scrambled with a given identifier (for example, new RNTI or CS-RNTI).

Figure 3:
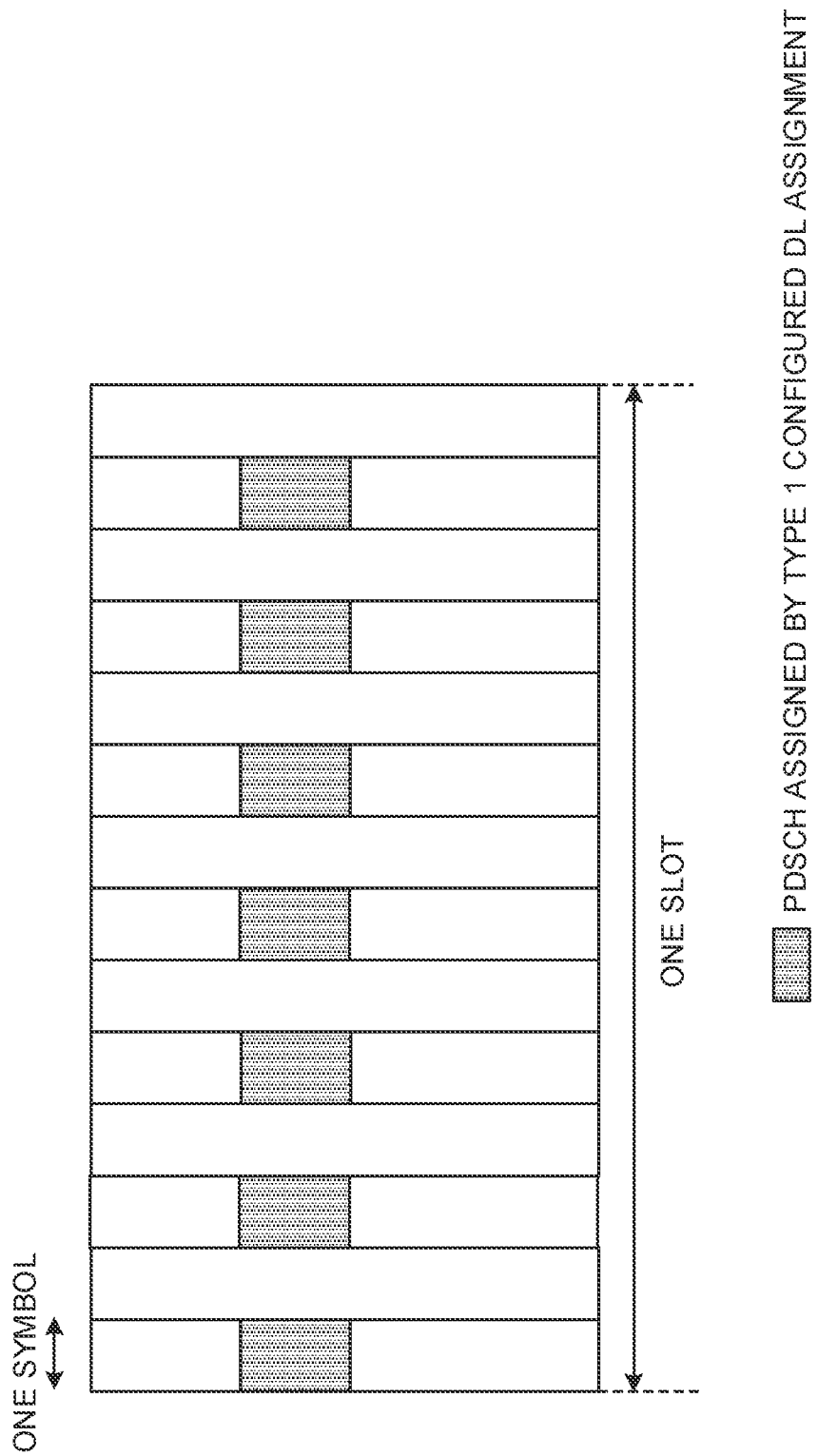
FIG. 3 is a diagram showing an example of the PDSCH of a type 1 configured DL assignment according to the first aspect.

FIG. 3 is a diagram showing an example of the PDSCH of the type 1 configured DL assignment according to the first aspect. In FIG. 3, for example, the cycle information indicates two symbols, but the PDSCH cycle is not limited to this.

As shown in FIG. 3, the user terminal monitors (blind decodes) the PDSCH in a given cycle (for example, two symbol cycle in FIG. 3) in the time domain resource and frequency domain resource configured by at least one of the higher layer parameters.

As shown in FIG. 3, in the type 1, in the time domain resource and the frequency domain resource configured by higher layer signaling, the PDSCH is monitored in a given cycle without monitoring the PDCCH candidates. Therefore, in FIG. 3, even when the maximum number of the PDCCH candidates monitored per slot is limited as shown in FIG. 1A, the probability of occurrence of the DCI blocking can be reduced.

<Type 2>

In the type 2, based on the DCI indicating activation or de-activation according to the parameter configured by higher layer signaling, the user terminal may control reception of the PDSCH.

For example, the user terminal may receive at least one higher layer parameter of the following:

Information (also referred to as retransmission RNTI information, cs-RNTI, etc.) indicating a given identifier (for example, new RNTI or CS-RNTI) used for CRC scrambling of the DCI for at least one of scheduling the activated PDSCH, scheduling the de-activated PDSCH, and scheduling the retransmitted PDSCH Information (also referred to as cycle information, periodicity, etc.) indicating the PDSCH transmission cycle Information (HARQ process number information, nrof-HARQ-Processes) indicating the number of HARQ processes for the PDSCH The cycle information may be configured to be able to set the cycle (time interval) shorter than that of the downlink semi-persistent scheduling used for voice communication or the like such as, for example, 2, 7, 1×14, 2×14, 4×14, 5×14, 8×14, . . . , or 5120×14 symbols, etc.

Further, the DCI that is CRC scrambled with the given identifier may include at least one lower layer parameter (physical layer parameter) of the following:

Information (also referred to as activation information) indicating activation or de-activation Information (also referred to as retransmission information, new data identifier (NDI), etc.) on whether it is used for scheduling the retransmission PDSCH Information (also referred to as time domain resource allocation information, timeDomainAllocation, time-DomainAllocation, etc.) about the time domain resource allocated to the PDSCH Information (also referred to as modulation and coding scheme (MCS) index, mcsAndTBS, etc.) about at least one of the PDSCH modulation system, the coding rate, and the transport block size (TBS)

Information (also referred to as frequency domain resource allocation information, frequencyDomainAllocation, frequencyDomainAllocation, etc.) about the frequency domain resource allocated to the PDSCH Information (DMRS information, DMRS-DownlinkConfig) about the PDSCH demodulation reference signal (DMRS).

The user terminal monitors (blind decoding) the DCI (for example, DCI format 1_0, 1_1 or DL assignment) that is CRC scrambled by the above-mentioned given identifier (for example, new RNTI or CS-RNTI).

When the detected DCI (activation information therein) indicates activation, the user terminal may control the PDSCH reception based on the detected DCI and the at least one received higher layer parameter. For example, the user terminal may monitor (blind decode) subsequent the PDSCHs at the cycle (time interval) indicated by the cycle information in the time domain resource indicated by the time domain resource allocation information designated by the DCI and the frequency domain resource indicated by the frequency domain resource allocation information.

When the detected DCI (activation information therein) indicates de-activation, the user terminal may clear the configured DL assignment and stop monitoring the PDSCH in a given cycle.

Further, when the detected DCI (retransmission information therein) indicates the retransmitted PDSCH, the user terminal may control reception of the retransmitted PDSCH based on the DCI.

In addition, when there is no data in the buffer of the radio base station, the radio base station may skip transmission of the PDSCH even when the PDSCH transmission by the configured DL assignment is activated.

Further, the user terminal may feed back a delivery confirmation signal (acknowledge (ACK)) indicating whether the DCI indicating activation or de-activation has been correctly received to the radio base station. The ACK may be included in the physical layer uplink control information (UCI) or the MAC control element (MAC CE).

Figure 4:
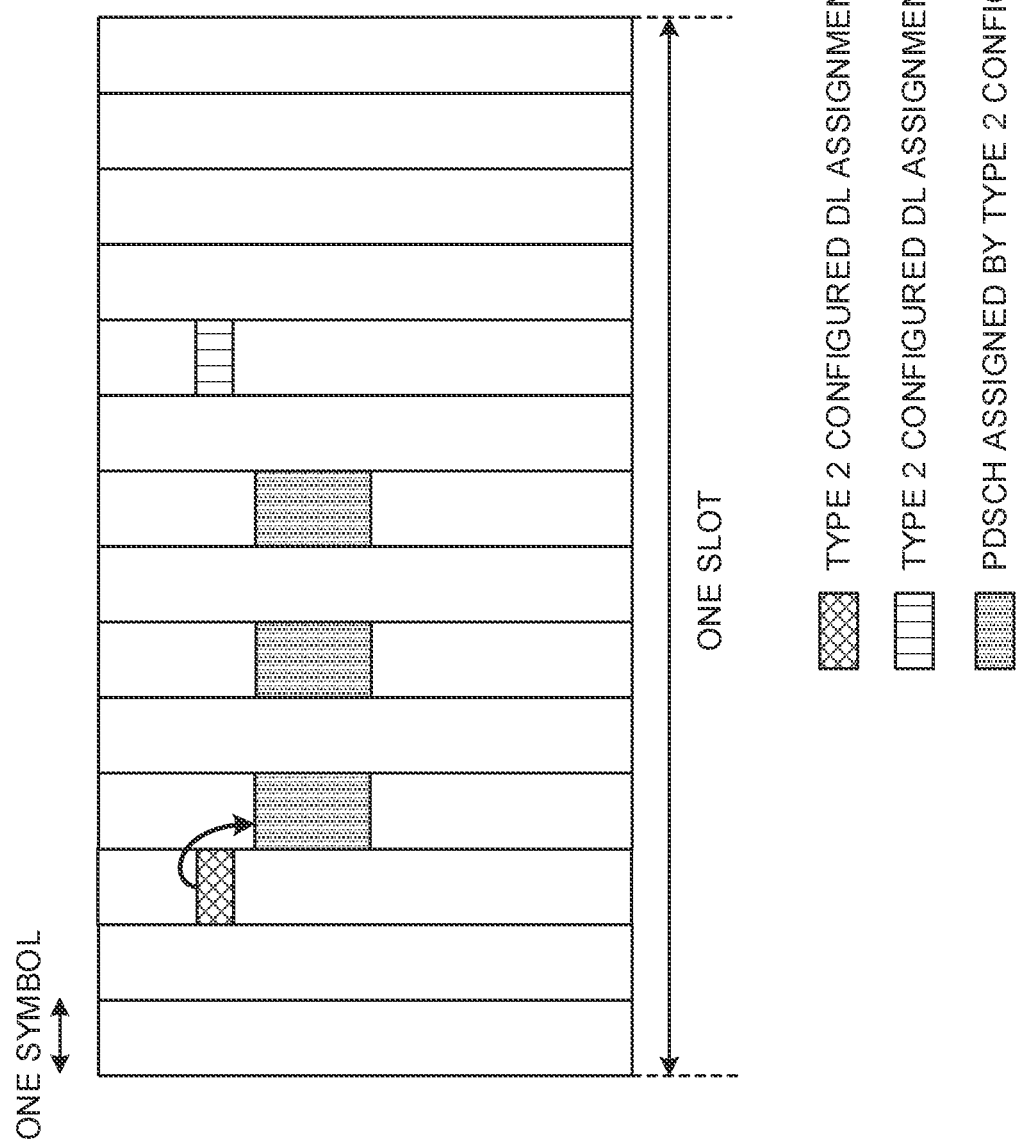
FIG. 4 is a diagram showing an example of the PDSCH of a type 2 configured DL assignment according to the first aspect.

FIG. 4 is a diagram showing an example of the PDSCH of the type 2 configured DL assignment according to the first aspect. In FIG. 4, for example, it is assumed that the cycle information is set to two symbols.

As shown in FIG. 4, when detecting the DCI indicating the activation, the user terminal monitors (blind decodes) the PDSCH in a given cycle (for example, two symbol cycle in FIG. 4) in the time domain resource and the frequency domain resource designated by at least one lower layer parameter included in the DCI.

As shown in FIG. 4, when detecting the DCI indicating de-activation, the user terminal stops monitoring (blind decoding) the PDSCH in the given cycle (for example, two symbol cycle in FIG. 4).

As shown in FIG. 4, in the type 2, when detecting the DCI that indicates activation, in the time domain resource and the frequency domain resource designated by the DCI, the user terminal monitors the PDSCH in the given cycle without monitoring the PDCCH candidates. Therefore, in FIG. 4, even when the maximum number of the PDCCH candidates monitored per slot is limited as shown in FIG. 1A, the DCI blocking probability can be reduced.

<Type 3>

In the type 3, by the second DCI transmitted by the PDSCH scheduled by the first DCI transmitted in the first cycle, the PDSCH may be scheduled between the two first DCIs in the first cycle.

The second DCI may be transmitted as downlink data (for example, MAC CE) by the PDSCH scheduled by the first DCI.

Alternatively, the second DCI may be piggybacked on the PDSCH scheduled by the first DCI. Note that the second DCI may be mapped to the PDSCH by applying at least one of rate matching and puncturing to the downlink data transmitted by the PDSCH.

Figure 5:
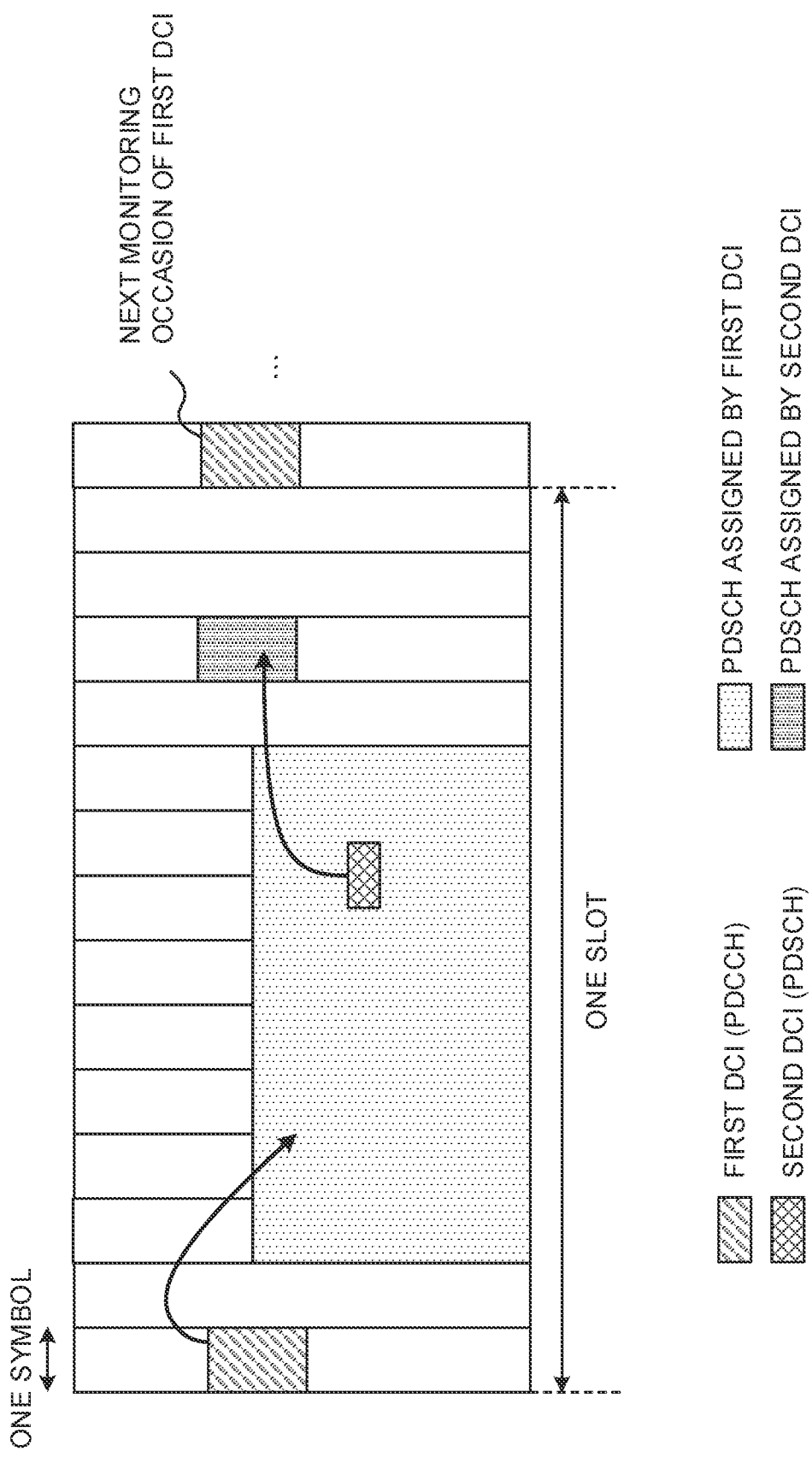
FIG. 5 is a diagram showing an example of the PDSCH of a Type 3 according to the first aspect.

FIG. 5 is a diagram showing an example of the PDSCH of the type 3 according to the first aspect. In FIG. 5, for example, a case where the cycle of the first DCI monitoring occasion is one slot (14 symbols) is illustrated, but the present invention is not limited to this.

For example, in FIG. 5, the user terminal monitors the monitoring occasion of one slot cycle, and detects the first DCI (for example, DCI format 1_0, 1_1 or DL assignment) transmitted via the PDCCH.

Here, the first DCI may include at least one piece of information of the following:

Information (also referred to as DMRS information, etc.) about the DMRS of the PDSCH Information (also referred to as MCS index, etc.) about at least one of the PDSCH modulation system, the coding rate, and the transport block size (TBS)

Information (retransmission information, new data identifier (also referred to as NDI, etc.)) on whether it is used for scheduling the retransmission PDSCH Information (also referred to as HARQ-process number (HPN)) indicating the HARQ process number The user terminal receives the PDSCH based on the first DCI. The user terminal decodes the PDSCH and detects the second DCI. As described above, the second DCI may be included in the MAC CE transmitted via the PDSCH, or may be piggybacked on the PDSCH.

Here, the second DCI may include at least one piece of information of the following:

Commands (also referred to as TPC command) used for transmission power control (TPC) of the uplink channel (for example, a physical uplink control channel (PUCCH))

Information (also referred to as PUCCH resource identifier, etc.) indicating the uplink resource (for example, resource for PUCCH (PUCCH resource))

Information (also referred to as buffer status report (BSR)) about the status of the buffer in the radio base station Countdown or active timer The second DCI may include at least one piece of information (demodulation information) of the following in order to demodulate the PDSCH scheduled by the second DCI:

Information (also referred to as DMRS information, etc.) about the DMRS of the PDSCH Information (also referred to as MCS index, etc.) about at least one of the PDSCH modulation system, the coding rate, and the transport block size (TBS)

Information (retransmission information, new data identifier (also referred to as NDI, etc.)) indicating whether it is used for scheduling the retransmission PDSCH Information (HARQ-process number (HARQ)) indicating the HARQ process number The user terminal receives the PDSCH based on the second DCI. For example, as shown in FIG. 2, the PDSCH received based on the second DCI may be scheduled by the next monitoring occasion of the first DCI. Also, the user terminal may control feedback of delivery acknowledgement information (HARQ-ACK, ACK/NACK) of the PDSCH based on the second DCI.

Note that the demodulation information may not be included in the second DCI, but may be included in the first DCI, and the user terminal may receive the PDSCH scheduled by the second DCI based on the demodulation information included in the first DCI.

As shown in FIG. 5, in the type 3, since the second DCI is transmitted using the PDSCH, the PDSCH scheduled by the second DCI can be received in a cycle shorter than the monitoring occasion of the first DCI without monitoring the PDCCH candidates. Therefore, in FIG. 5, even when the maximum number of the PDCCH candidates monitored per slot is limited as shown in FIG. 1A, the DCI blocking probability can be reduced.

<HARQ-ACK Feedback Control>

HARQ-ACK transmission control for the PDSCH scheduled by the type 1 or the type 2 configured DL assignment and the type 3 second DCI will be described.

The user terminal does not have to feed back the HARQ-ACK (ACK and NACK) for the PDSCH. Alternatively, the user terminal may feed back only the ACK for the PDSCH.

Whether the user terminal (1) feeds back the ACK when the PDSCH is successfully decoded, and feeds back the NACK when the PDSCH decoding fails (behavior 1), or (2) feeds back the ACK when the PDSCH is successfully decoded, and does not feed back anything when the PDSCH decoding fails (behavior 2), may be configured by higher layer signaling.

When notification of information indicating the above behavior 1 is provided from the radio base station to the user terminal in the higher layer signaling, the user terminal may operate according to the behavior 1. When notification of the information is not provided, the default operation (for example, behavior 2) of the user terminal may or may not be defined.

Similarly, when notification of information indicating the above behavior 2 is provided from the radio base station to the user terminal in the higher layer signaling, the user terminal may operate according to the behavior 2. When notification of the information is not provided, the default operation (for example, behavior 1) of the user terminal may or may not be defined.

Whether to feed back the HARQ-ACK of the PDSCH scheduled by the second DCI of the type 3 may be controlled based on whether the second DCI includes the PUCCH resource identifier.

For example, when the second DCI includes the PUCCH resource identifier, the user terminal may transmit the HARQ-ACK of the PDSCH scheduled by the second DCI using the PUCCH resource indicated by the PUCCH resource identifier. On the other hand, when the second DCI does not include the PUCCH resource identifier, the user terminal does not have to transmit the HARQ-ACK of the PDSCH scheduled by the second DCI.

<PDSCH Monitoring Control>

When the user terminal successfully detects (also referred to as demap, demodulate, decode, etc.) the PDSCH scheduled by the type 1 or the type 2 configured DL assignment, or the type 3 second DCI, the radio base station may notify the user terminal of at least one piece of information of the following in order to reduce at least one of the processing load and power consumption due to monitoring (blind decoding) in the user terminal:

(1) Radio base station side BSR (2) Information (also referred to as monitoring the PDSCH information, etc.) about the PDSCH monitored by the user terminal (1) The BSR may indicate information about the amount of downlink data stored in the buffer of the radio base station. The user terminal may control the PDSCH monitoring in the time domain resource and the frequency domain resource assigned by the type 1 or 2 configured DL assignment based on the BSR. For example, when the BSR indicates that the amount of downlink data stored in the buffer of the radio base station is less than or equal to (less than) a given threshold or 0, the user terminal may reduce the frequency of monitoring the PDSCH (may lengthen the monitoring cycle). The BSR may be transmitted from the radio base station to the user terminal by at least one of higher layer signaling (for example, MAC protocol data unit (PDU) and physical layer signaling (for example, DCI).

(2) The monitoring the PDSCH information may indicate the number of the PDSCHs that the user terminal is required to continue demodulating, or may indicate whether the user terminal is required to continue monitoring the next the PDSCH. Notification of the monitoring the PDSCH information may be explicitly provided to the user terminal or may be implicitly provided to the user terminal. The monitoring the PDSCH information may be transmitted from the radio base station to the user terminal by at least one of higher layer signaling and physical layer signaling (for example, DCI).

As mentioned above, in the first aspect, since the type 1 or 2 configured DL assignment or the type 3 two-stage DCI is used, the DCI blocking probability can be reduced while suppressing the number of the PDCCH candidates monitored per slot.

(Second Aspect)

In the second aspect, a single DCI (one DCI) including the UL grant and the DL assignment will be described. For example, it is assumed that both the DL traffic and the UL traffic are active in communication such as the URLLC, which requires ultra-high reliability and low latency.

Therefore, in the second aspect, instead of transmitting both the UL grant and the DL assignment in a single monitoring occasion, the user terminal transmits a single DCI including both the UL grant and the DL assignment. As a result, since it is sufficient to transmit the single DCI for the user terminal at the monitoring occasion, the probability of occurrence of blocking can be reduced, compared to when transmitting two DCIs of UL grant and DL assignment.

In the user terminal, as a single DCI including the UL grant and the DL assignment, at least one DCI (also referred to as DCI format, DCI type, etc.) of the following may be supported (or may be configured):

(1) DCI including the whole set of DL scheduling information and the whole set of UL scheduling information (2) DCI including the whole set of DL scheduling information and a partial set of UL scheduling information (3) DCI including the whole set of DL scheduling information and information indicating activation or de-activation of UL transmission (4) DCI including a partial set of DL scheduling information and the whole set of UL scheduling information (5) DCI including a partial set of DL scheduling information and a partial set of UL scheduling information (6) DCI including a partial set of DL scheduling information and information indicating activation or de-activation of UL transmission (7) DCI including information indicating activation or de-activation of DL transmission and the whole set of UL scheduling information (8) DCI including information indicating activation or de-activation of DL transmission and a partial set of UL scheduling information (9) DCI including information indicating activation or de-activation of DL transmission and information indicating activation or de-activation of UL transmission Here, the whole set of DL scheduling information may indicate, for example, at least a partial field included in DCI format 1_0 or 1_1 (for example, time domain resource allocation field, frequency domain resource allocation field, a field for information about the DMRS, etc., all fields of DCI format 1_0 or 1_1). On the other hand, the partial set of DL scheduling information may be, for example, a partial field included in DCI format 1_0 or 1_1 (for example, time domain resource allocation field, frequency domain resource allocation field, etc.).

Similarly, the whole set of UL scheduling information, may indicate, for example, at least a partial field included in DCI format 0_0 or 0_1 (for example, time domain resource allocation field, frequency domain resource allocation field, a field for information about the DMRS, etc., all fields of DCI format 0_0 or 0_1). On the other hand, the partial set of UL scheduling information may be, for example, a partial field included in DCI format 0_0 or 0_1 (for example, time domain resource allocation field, frequency domain resource allocation field, etc.).

When the above DCI includes none of information of DL scheduling information (including a partial set, or information indicating activation or de-activation) (for example, see (4) to (9) above), at least part of the DL scheduling information may be set in the user terminal by higher layer signaling.

Further, when the DCI includes none of information of the UL scheduling information (including a partial set, or information indicating activation or de-activation) (for example, see (2), (3), (5), (6), (8), and (9)), at least part of the UL scheduling information may be set in the user terminal by higher layer signaling.

Thus, in the second aspect, the user terminal may control both the PDSCH reception and the PUSCH transmission based on the DCI including the DL assignment and the UL grant. Also, the user terminal may control both the PDSCH reception and the PUSCH based on the DCI and higher layer signaling (for example, RRC signaling).

The "activation" of DL scheduling information may indicate that the PDSCH is scheduled, and the "de-activation" may indicate that the PDSCH is not scheduled.

Further, "activation" of the UL scheduling information may indicate that the PUSCH is scheduled, and "de-activation" may indicate that the PUSCH is not scheduled.

Further, the DCI may be CRC scrambled by a given identifier (for example, new RNTI or C-RNTI (Cell-RNTI)).

In the second aspect, when the PUSCH is scheduled (there is UL data), the HARQ-ACK for the PDSCH may be piggybacked for the PUSCH used to transmit the UL data. In this case, a given field (for example, PUCCH resource identifier, TPC command) in the DCI that schedules the PDSCH may be omitted.

The PUSCH used for the HARQ-ACK of the PDSCH may be scheduled without uplink data in the user terminal. Further, even when the PUSCH is scheduled according to the scheduling request (scheduling request (SR)) from the user terminal, the HARQ-ACK of the PDSCH may be transmitted to the PUSCH without including uplink data.

In the second aspect, the DCI including at least part of the DL assignment (for example, DCI format 1_0, 1_1) and at least part of the UL grant (for example, DCI format 0_0, 0_1) is used. Therefore, it is not necessary to separately transmit both the DL assignment and the UL grant, and it is possible to reduce the DCI blocking probability while suppressing the number of the PDCCH candidates monitored per slot.

(Radio Communication System)

Now, the structure of a radio communication system according to the present embodiment will be described below. In this radio communication system, communication is performed using at least one combination of the above-mentioned plurality of aspects.

Figure 6:
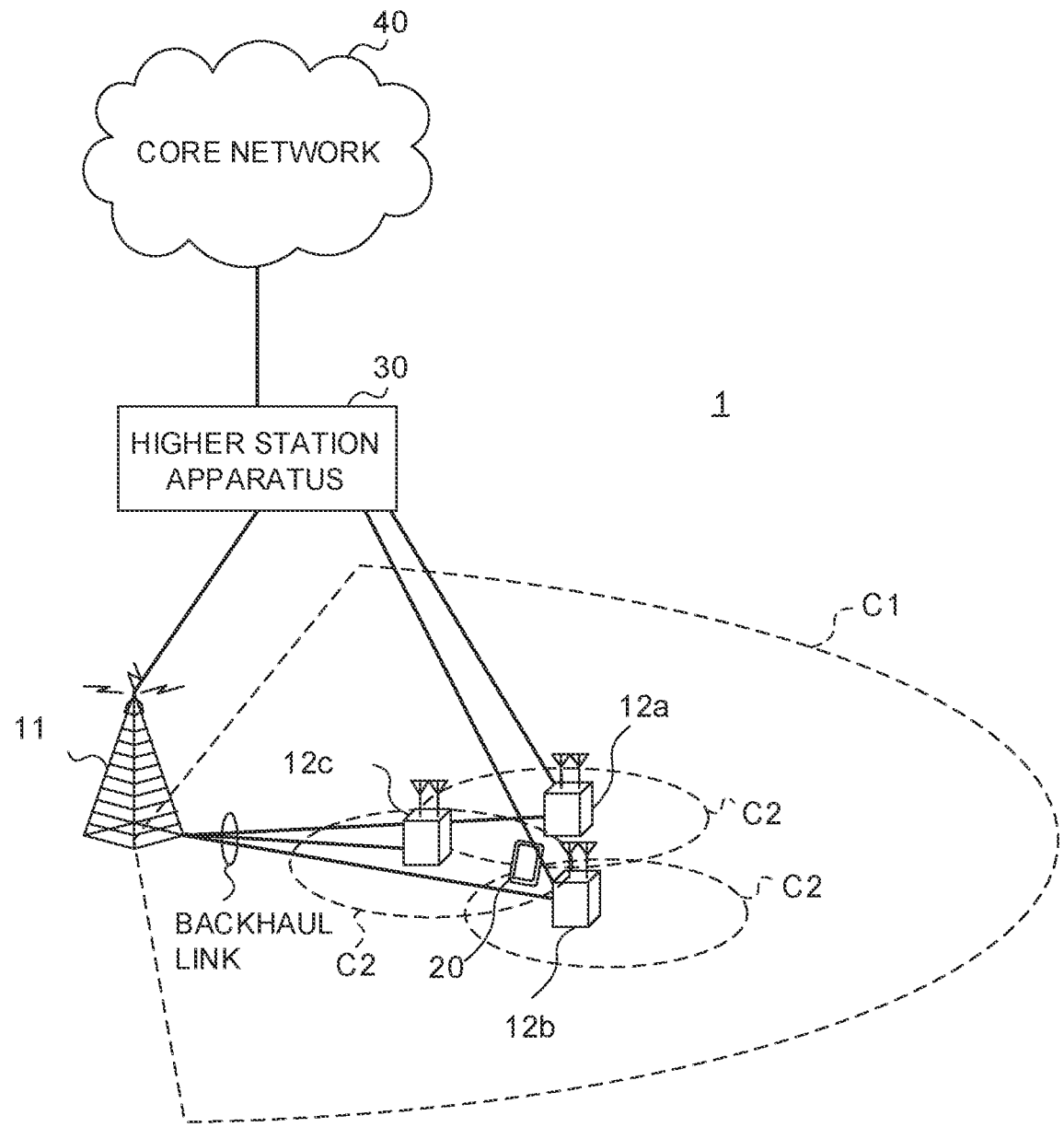
FIG. 6 is a diagram illustrating an example of a schematic structure of a radio communication system according to the present embodiment.

FIG. 6 is a diagram illustrating an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

The radio communication system 1 may be referred to as a long term evolution (LTE), an LTE-Advanced (LTE-A), an LTE-Beyond (LTE-B), SUPER 3G, IMT-Advanced, a 4th generation mobile communication system (4G), a 5th generation mobile communication system (5G), a new radio (NR), a future radio access (FRA), a radio access technology (New-RAT), or the like, or may be referred to as a system that achieves these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, a user terminal 20 is placed in the macro cell C1 and in each small cell C2. The arrangement, the number, and so on of cells and user terminals 20 are not limited to those illustrated in the drawings.

The user terminal 20 can be connected to both the radio base station 11 and the radio base stations 12. The user terminal 20 may use the macro cell C1 and the small cells C2 at the same time using CA or DC. Furthermore, the user terminal 20 may apply CA or DC using a plurality of cells (CCs) (for example, five or fewer CCs or six or more CCs).

Between the user terminal 20 and the radio base station 11, communication can be carried out using a carrier of a relatively low frequency band (for example, 2 GHz) and a narrow bandwidth (referred to as an existing carrier, a legacy carrier, and so on). On the other hand, between the user terminals 20 and the radio base stations 12, a carrier of a relatively high frequency band (for example, 3.5 GHz, 5 GHz, and so on) and a wide bandwidth may be used, or the same carrier as that used in the radio base station 11 may be used. Note that the structure of the frequency band for use in each radio base station is not limited to these.

Moreover, the user terminal 20 can perform communication in each cell using time division duplex (TDD) and/or frequency division duplex (FDD). Further, in each cell (carrier), a single numerology may be applied, or a plurality of different numerologies may be applied.

The numerology may be a communication parameter applied to transmission and/or reception of a signal and/or a channel, and may indicates, for example, at least one of the subcarrier interval, the bandwidth, symbol length, the cyclic prefix length, the subframe length, the TTI length, the number of symbols per TTI, the radio frame configuration, the filtering processing, the windowing processing, and so on.

The radio base station 11 and the radio base station (or between 2 radio base stations 12) may be connected by wire (for example, an optical fiber in compliance with the common public radio interface (CPRI), an X2 interface, and so on) or wirelessly.

The radio base station 11 and each radio base station 12 are each connected with a higher station apparatus 30, and are connected with a core network 40 via the higher station apparatus 30. Note that the higher station apparatus 30 may include, for example, an access gateway apparatus, a radio network controller (RNC), a mobility management entity (MME), and so on, but is limited to these. Also, each radio base station 12 may be connected to the higher station apparatus 30 via the radio base station 11.

Note that the radio base station 11 is a radio base station having a relatively wide coverage, and may be referred to as a macro base station, a central node, an eNodeB (eNB), a transmission/reception point, or the like. Also, the radio base station 12 is a radio base station having a local coverage, and may be referred to as a small base station, a micro base station, a pico base station, a femto base station, a home eNodeB (HeNB), a remote radio head (RRH), a transmission/reception point, or the like. Hereinafter the radio base stations 11 and 12 will be collectively referred to as a radio base station 10, unless specified otherwise.

Each user terminal 20 is a terminal to support various communication schemes such as LTE, LTE-A, and so on, and may be either a mobile communication terminal (mobile station) or a stationary communication terminal (fixed station).

In the radio communication system 1, as a radio access method, an orthogonal frequency division multiple access (OFDMA) is applied to the downlink, and a single-carrier frequency division multiple access (SC-FDMA) and/or OFDMA is applied to the uplink.

The OFDMA is a multi-carrier transmission scheme to perform communication by dividing a frequency bandwidth into a plurality of narrow frequency bandwidths (subcarriers) and mapping data to each subcarrier. The SC-FDMA is a single-carrier transmission scheme to mitigate interference between terminals by dividing the system bandwidth into bands formed of one or continuous resource blocks per terminal, and allowing a plurality of terminals to use mutually different bands. The uplink and downlink radio access methods are not limited to combinations of these, and other radio access methods may be used.

In the radio communication system 1, a downlink shared channel (physical downlink shared channel (PDSCH)), which is used by each user terminal 20 on a shared basis, a broadcast channel (physical broadcast channel (PBCH)), a downlink L1/L2 control channel, and so on are used as downlink channels. User data, higher layer control information, and a system information block (SIB) are transmitted by the PDSCH. Further, a master information block (MIB) is transmitted by the PBCH.

The downlink L1/L2 control channel includes at least one of a downlink control channel (physical downlink control channel (PDCCH) and/or an enhanced physical downlink control channel (EPDCCH)), a physical control format indicator channel (PCFICH), and a physical hybrid-ARQ indicator channel (PHICH). The downlink control information (DCI) including the PDSCH and/or the PUSCH scheduling information, and so on, is transmitted by the PDCCH.

Note that notification of scheduling information may be provided via the DCI. For example, the DCI for scheduling receipt of DL data may be referred to as a DL assignment, and the DCI for scheduling transmission of UL data may be referred to as a UL grant.

The number of OFDM symbols to be used for the PDCCH is transmitted by the PCFICH. A hybrid automatic repeat request (HARQ) delivery acknowledgement information (also referred to as, for example, retransmission control information, HARQ-ACK, ACK/NACK, and so on) in response to the PUSCH is transmitted by the PHICH. The EPDCCH is frequency-division-multiplexed with the downlink shared data channel (PDSCH) and used to for transmission of DCI and so on, like the PDCCH.

In the radio communication system 1, an uplink shared channel (physical uplink shared channel (PUSCH)), which is used by each user terminal 20 on a shared basis, an uplink control channel (physical uplink control channel (PUCCH)), a random access channel (physical random access channel (PRACH)), and so on are used as uplink channels. User data, higher layer control information, and so on are transmitted by the PUSCH. Also, downlink radio link quality information (channel quality indicator (CQI)), delivery acknowledgement information, scheduling request (SR), and so on are transmitted by the PUCCH. The random access preamble for establishing connections with cells is transmitted by the PRACH.

In the radio communication systems 1, a cell-specific reference signal (CRS), a channel state information reference signal (CSI-RS), a demodulation reference signal (DMRS), a positioning reference signal (PRS), and so on are transmitted as downlink reference signals. Also, in the radio communication system 1, a measurement reference signal (sounding reference signal (SRS)), a demodulation reference signal (DMRS), and so on are transmitted as uplink reference signals. Note that the DMRS may be referred to as a user terminal specific reference signal (UE-specific Reference Signal). Also, the reference signals to be transmitted are limited to these.

<Radio Base Station>

Figure 7:
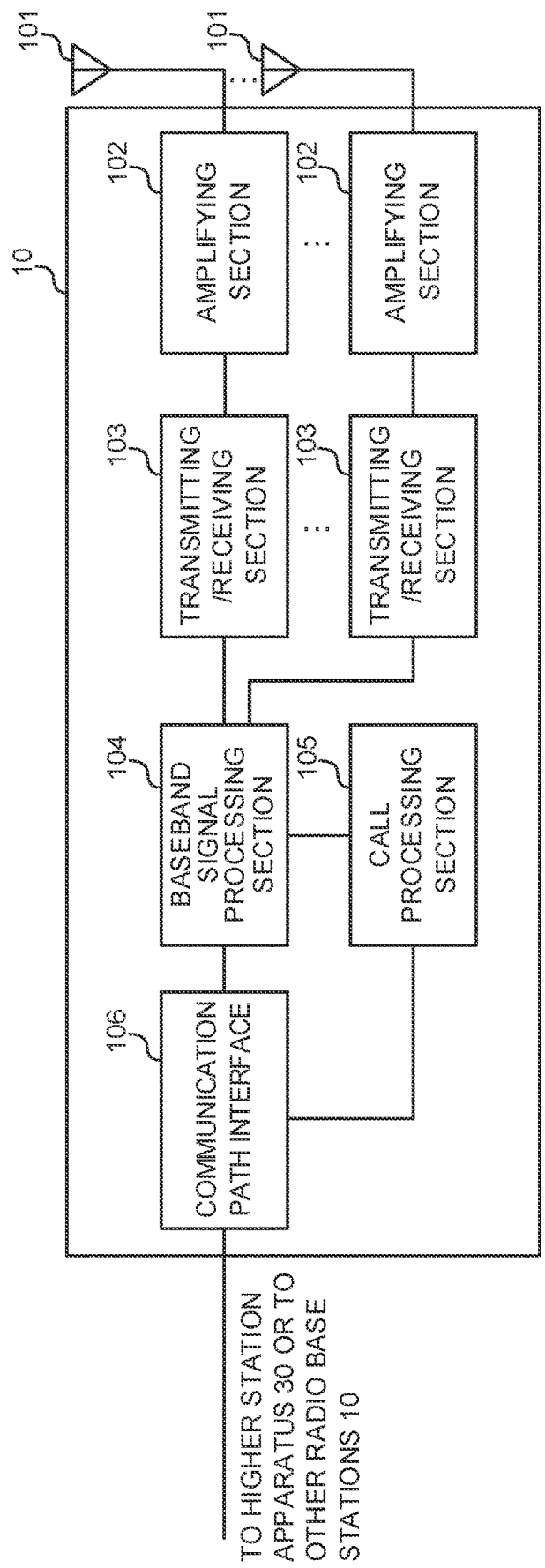
FIG. 7 is a diagram illustrating an example of an overall structure of a radio base station according to the present embodiment.

FIG. 7 is a diagram illustrating an example of an overall structure of a radio base station according to the present embodiment. Each radio base station 10 has a plurality of transmitting/receiving antennas 101, amplifying sections 102, transmitting/receiving sections 103, a baseband signal processing section 104, a call processing section 105, and a communication path interface 106. Note that one or more transmitting/receiving antennas 101, amplifying sections 102, and transmitting/receiving sections 103 may be provided.

User data to be transmitted from the radio base station 10 to the user terminal 20 on the downlink is input from the higher station apparatus 30 to the baseband signal processing section 104 via the communication path interface 106.

In the baseband signal processing section 104, user data is subjected to transmission processes including a packet data convergence protocol (PDCP) layer process, division and coupling of the user data, a radio link control (RLC) layer transmission process such as RLC retransmission control, medium access control (MAC) retransmission control (for example, a hybrid automatic repeat request (HARQ) transmission process), scheduling, transmission format selection, channel coding, an inverse fast Fourier transform (IFFT) process, and a precoding process, and the result is transferred to the transmitting/receiving section 103. Furthermore, the downlink control signal is subjected to transmission processes such as channel coding and inverse fast Fourier transform, and the result is transferred to the transmitting/receiving section 103.

The transmitting/receiving section 103 converts the baseband signal that is pre-coded and output from the baseband signal processing section 104 on a per antenna basis into a radio frequency band, and then transmits the converted baseband signal. The radio frequency signal having been subjected to frequency conversion in the transmitting/receiving section 103 is amplified by the amplifying section 102, and transmitted from the transmitting/receiving antenna 101. The transmitting/receiving section 103 can be constituted by a transmitters/receiver, a transmitting/receiving circuit, or transmitting/receiving apparatus that is described based on common understanding of the technical field according to the present disclosure. Note that the transmitting/receiving section 103 may be structured as a transmitting/receiving section in one entity, or may be constituted by a transmitting section and a receiving section.

On the other hand, as for the uplink signal, the radio frequency signal that is received by the transmitting/receiving antenna 101 is amplified by the amplifying section 102. The transmitting/receiving section 103 receives the uplink signals amplified by the amplifying section 102. The transmitting/receiving section 103 frequency converts the received signal into the baseband signal, and outputs it to the baseband signal processing section 104.

In the baseband signal processing section 104, user data included in the input uplink signal is subjected to fast Fourier transform (FFT) processing, inverse discrete Fourier transform (IDFT) processing, error correction decoding, a receiving process for MAC retransmission control, and a receiving process for an RLC layer and a PDCP layer, and the processed user data is transferred to the higher station apparatus 30 via the communication path interface 106. The call processing section 105 performs call processing (such as setting and releasing) for communication channels, manages the state of the radio base station 10, manages the radio resource, and so on.

The communication path interface 106 transmits and receives signals to and from the higher station apparatus 30 via a given interface. Moreover, the communication path interface 106 may transmit and receive (perform backhaul signaling for) signals with another radio base station 10 via an inter-base station interface (for example, an optical fiber in compliance with a common public radio interface (CPRI), and an X2 interface).

The transmitting/receiving section 103 may further include an analog beamforming section that implements analog beamforming. The analog beamforming section can be constituted by an analog beamforming circuit (for example, a phase shifter, a phase shift circuit) or an analog beamforming apparatus (for example, a phase shifter) described based on common understanding of the technical field to which the present invention pertains. Also, the transmitting/receiving antenna 101 can be constituted by an array antenna, for example. Also, the transmitting/receiving section 103 is configured such that single BF and multi BF can be used.

The transmitting/receiving section 103 may transmit a signal using a transmission beam and may receive a signal using a reception beam. The transmitting/receiving section 103 may transmit and/or receive a signal using a given beam determined by a control section 301.

In addition, the transmitting/receiving section 103 transmits, to the user terminal 20, the downlink (DL) signal (including at least one of the DL data signal (downlink shared channel), the DL control signal (downlink control channel), and the DL reference signal), and receives, from the user terminal 20, the uplink (UL) signal (including at least one of the UL data signal, the UL control signal, and the UL reference signal).

In addition, the transmitting/receiving section 103 transmits DCI (for example, two-stage DCI including the first and second DCI) to the user terminal 20 using the downlink control channel. Further, the transmitting/receiving section 103 may transmit at least one of the higher layer parameter and the lower layer parameter.

Figure 8:
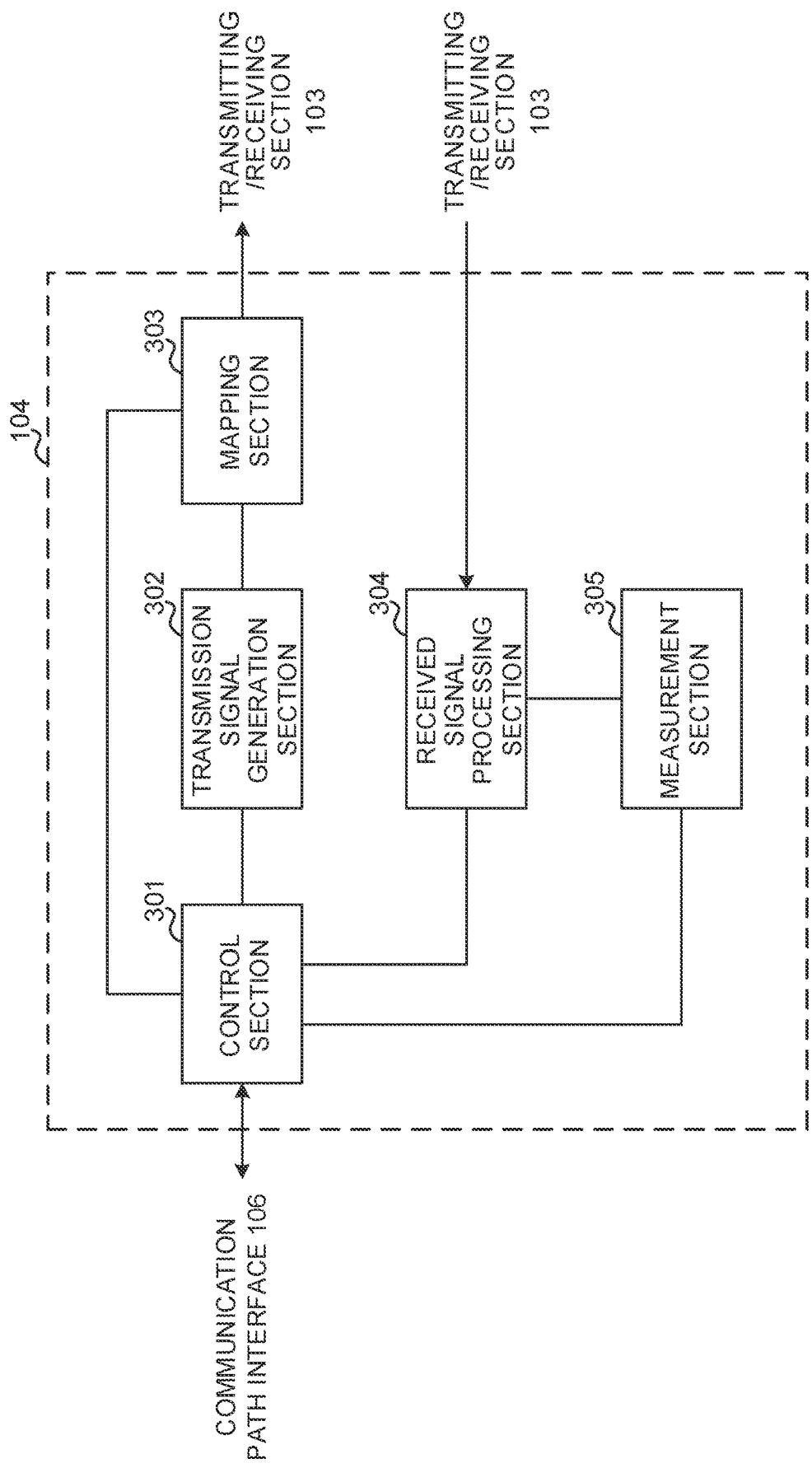
FIG. 8 is a diagram illustrating an example of a functional structure of the radio base station according to the present embodiment.

FIG. 8 is a diagram illustrating an example of a functional structure of a radio base station according to the present embodiment. Note that, although this example will primarily show functional blocks that pertain to characteristic parts of the present embodiment, the radio base station 10 may be assumed to have other functional blocks that are necessary for radio communication as well.

The baseband signal processing section 104 includes at least a control section (scheduler) 301, a transmission signal generation section 302, a mapping section 303, a received signal processing section 304, and a measurement section 305. Note that these components have only to be included in the radio base station 10, and some or all of these components may not be included in the baseband signal processing section 104.

The control section (scheduler) 301 controls the whole of the radio base station 10. The control section 301 can be constituted by a controller, a control circuit, or a control apparatus that is described based on common understanding of the technical field according to the present disclosure.

The control section 301 controls, for example, generation of the signal in the transmission signal generation section 302, the allocation of the signal by the mapping section 303, and so on. Furthermore, the control section 301 controls the signal receiving process by the received signal processing section 304, the measurements of the signal by the measurement section 305, and so on.

The control section 301 controls the scheduling (for example, resource allocation) of the system information, the downlink data signal (for example, the signal transmitted in the PDSCH), and the downlink control signal (for example, the signal transmitted in the PDCCH and/or the EPDCCH, delivery acknowledgement information, etc.). The control section 301 controls generation of the downlink control signal, the downlink data signal, and so on based on the results of determining whether retransmission control is necessary for the uplink data signal, and so on.

The control section 301 controls scheduling of the synchronization signal (for example, PSS/SSS), the downlink reference signal (for example, CRS, CSI-RS, DMRS), and so on.

The control section 301 may use digital BF (for example, precoding) by the baseband signal processing section 104 and/or analog BF (for example, phase rotation) by the transmitting/receiving section 103 to perform control of forming the transmission beam and/or the reception beam.

The control section 301 may control transmission of the downlink shared channel. Specifically, the control section 301 may control transmission of the downlink shared channel in the time domain resource and the frequency domain resource of the cycle configured by higher layer signaling (first aspect).

The time domain resource and the frequency domain resource may be configured in the user terminal by the higher layer signaling (first aspect, the type 1).

The time domain resource and the frequency domain resource may be designated to the user terminal by downlink control information indicating that transmission of the downlink shared channel in the cycle is activated (first aspect, the type 2).

The control section 301 may control retransmission of the downlink shared channel by downlink control information to which a cyclic redundancy check (CRC) bit scrambled by a specific identifier is added (first aspect).

The control section 301 may control transmission of the first downlink control information in the monitoring period of the given cycle. The control section 301 may control the transmission of the downlink shared channel scheduled by the next monitoring period based on the second downlink control information transmitted as a MAC control element via the downlink shared channel scheduled by the first downlink control information, or piggybacked on the downlink shared channel (first aspect, the type 3).

The control section 301 may control transmission of one piece of downlink control information detected in the monitoring period of the given cycle. Further, the control section 301 may control transmission of the downlink shared channel based on the information about the downlink shared channel included in the one piece of downlink control information, and may receive transmission of the uplink shared channel based on the information about the uplink shared channel included in the one piece of downlink control information.

The transmission signal generation section 302 generates downlink signals (downlink control signal, downlink data signal, downlink reference signal, and so on) based on the instruction from the control section 301 to output these signals to the mapping section 303. The transmission signal generation section 302 can be constituted by a signal generator, a signal generating circuit, or a signal generating apparatus, which is described based on common understanding of the technical field according to the present disclosure.

For example, the transmission signal generation section 302 generates the DL assignment which makes notification of downlink data allocation information, and/or the UL grant which makes notification of uplink data allocation information based on the instruction from the control section 301. The DL assignment and the UL grant are both DCI, and follow the DCI format. Also, the downlink data signal is subjected to the coding process, the modulation process, and so on by using the coding rate and the modulation system that are determined based on, for example, channel state information (CSI) reported from each user terminal 20.

The mapping section 303 maps the downlink signal generated in the transmission signal generation section 302 to a given radio resource based on the instruction from the control section 301 to output the generated signal to the transmitting/receiving sections 103. The mapping section 303 can be constituted by a mapper, a mapping circuit, or a mapping apparatus that is described based on common understanding of the technical field according to the present disclosure.

The received signal processing section 304 performs the receiving process (for example, demapping, demodulation, decoding, and so on) on the received signal that is input from the transmitting/receiving section 103. Here, the received signal includes, for example, the uplink signal transmitted from the user terminal 20 (the uplink control signal, the uplink data signal, the uplink reference signal, etc.). The received signal processing section 304 can be constituted by a signal processor, a signal processing circuit, or signal processing apparatus that is described based on common understanding of the technical field according to the present disclosure.

The received signal processing section 304 outputs, to the control section 301, information decoded by the receiving process. For example, when receiving the PUCCH including the HARQ-ACK, the received signal processing section 304 outputs the received HARQ-ACK to the control section 301. Also, the received signal processing section 304 outputs the received signal and/or the signal after the receiving process to the measurement section 305.

The measurement section 305 conducts the measurement with respect to the received signal. The measurement section 305 can be constituted by a measurer, a measurement circuit, or a measurement apparatus that is described based on common understanding of the technical field according to the present disclosure.

For example, the measurement section 305 may perform a radio resource management (RRM) measurement, a channel state information (CSI) measurement, and the like based on the received signal. The measurement section 305 may measure the received power (for example, reference signal received power (RSRP)), the received quality (for example, reference signal received quality (RSRQ)), the signal to interference plus noise ratio (SINR), the signal to noise ratio (SNR), the signal strength (for example, received signal strength indicator (RSSI)), the transmission path information (for example, CSI), and so on. The measurement results may be output to the control section 301.

(User Terminal)

Figure 9:
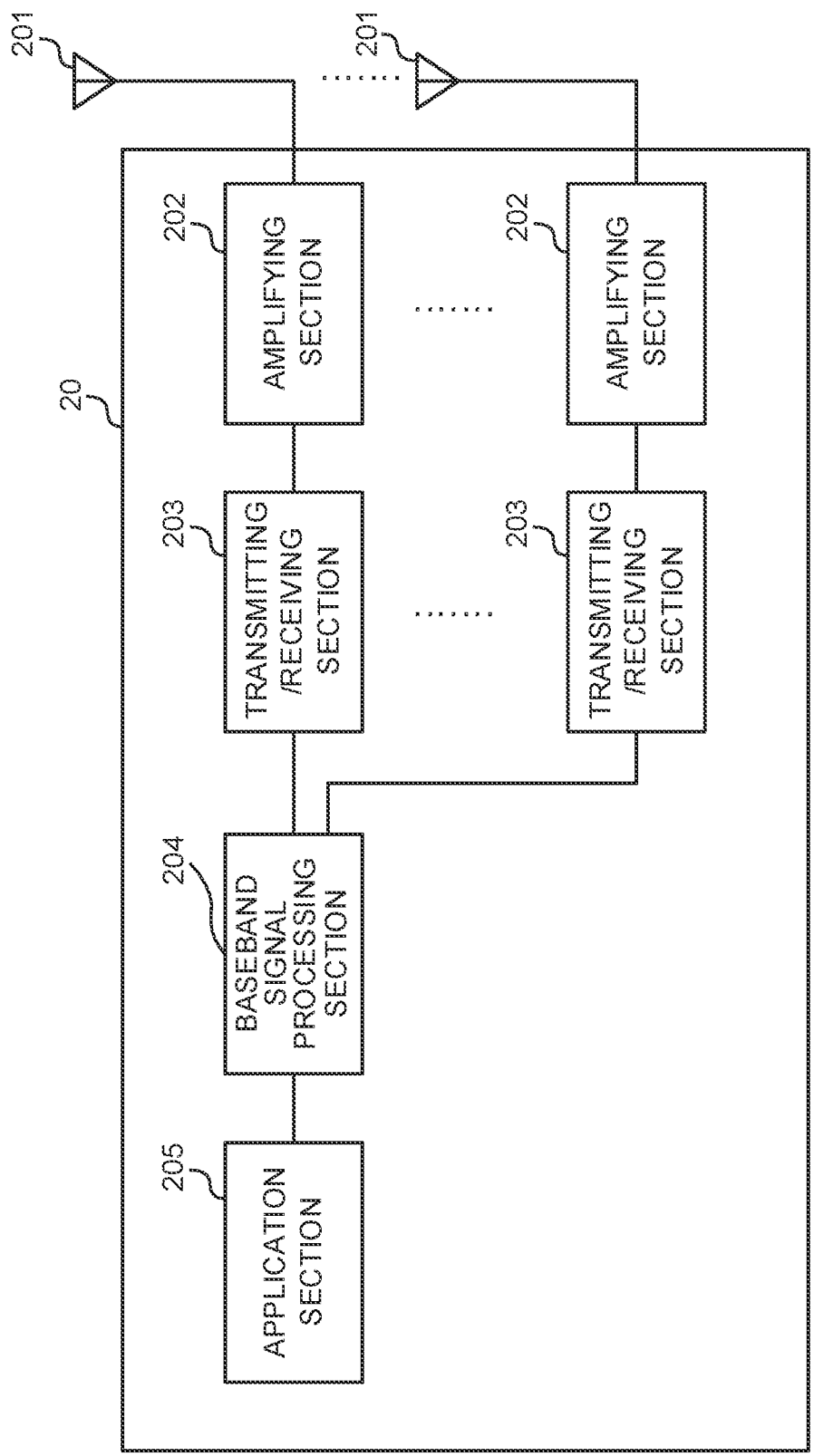
FIG. 9 is a diagram illustrating an example of an overall structure of a user terminal according to the present embodiment.

FIG. 9 is a diagram illustrating an example of an overall structure of a user terminal according to the present embodiment. The user terminal 20 has a plurality of transmitting/receiving antennas 201, amplifying sections 202, transmitting/receiving sections 203, a baseband signal processing section 204, and an application section 205. Note that one or more transmitting/receiving antennas 201, amplifying sections 202, and transmitting/receiving sections 203 may be provided.

The radio frequency signal that is received by the transmitting/receiving antenna 201 is amplified by the amplifying section 202. The transmitting/receiving section 203 receives the downlink signal amplified by the amplifying section 202. The transmitting/receiving section 203 frequency converts the received signal into the baseband signal, and outputs it to the baseband signal processing section 204. The transmitting/receiving section 203 can be constituted by a transmitter/receiver, a transmitting/receiving circuit, or a transmitting/receiving apparatus that is described based on common understanding of the technical field according to the present disclosure. The transmitting/receiving section 203 may be structured as a transmitting/receiving section in one entity, or may be constituted by a transmitting section and a receiving section.

The baseband signal processing section 204 performs the FFT process, the error correction decoding, the retransmission control receiving process, and so on the input baseband signal. Downlink user data is transferred to the application section 205. The application section 205 performs the process related to higher layers above the physical layer and the MAC layer, and so on. Further, in the downlink data, broadcast information may be transferred to the application section 205.

On the other hand, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process, and so on, and the result is transferred to the transmitting/receiving section 203.

The transmitting/receiving section 203 converts the baseband signal that is output from the baseband signal processing section 204 into a radio frequency band and transmits it. The radio frequency signal that is frequency converted by the transmitting/receiving section 203 is amplified by the amplifying sections 202, and transmitted from the transmitting/receiving antenna 201.

Note that the transmitting/receiving section 203 may further include an analog beamforming section that performs analog beamforming. The analog beamforming section can be constituted by an analog beamforming circuit (for example, a phase shifter, a phase shift circuit) or an analog beamforming apparatus (for example, a phase shifter) described based on common understanding of the technical field to which the present invention pertains. Also, the transmitting/receiving antenna 201 can be constituted by an array antenna, for example. Also, the transmitting/receiving section 203 is configured such that single BF and multi BF can be used.

The transmitting/receiving section 203 may transmit a signal using a transmission beam and may receive a signal using a reception beam. The transmitting/receiving section 203 may transmit and/or receive a signal using a given beam determined by a control section 401.

Further, the transmitting/receiving section 203 receives a downlink (DL) signal (including at least one of the DL data signal (downlink shared channel), the DL control signal (downlink control channel), and the DL reference signal) from the radio base station 10, and transmits an uplink (UL) signal (including at least one of the UL data signal, the UL control signal, and the UL reference signal) to the radio base station 10.

Further, the transmitting/receiving section 203 receives DCI (for example, a two-stage DCI including the first and second DCIs) for the user terminal 20 using the downlink control channel. Further, the transmitting/receiving section 103 may receive at least one of the higher layer parameter and the lower layer parameter. Further, the transmitting/receiving section 203 may transmit delivery acknowledgement information (for example, HARQ-ACK or only ACK) for the downlink shared channel.

Figure 10:
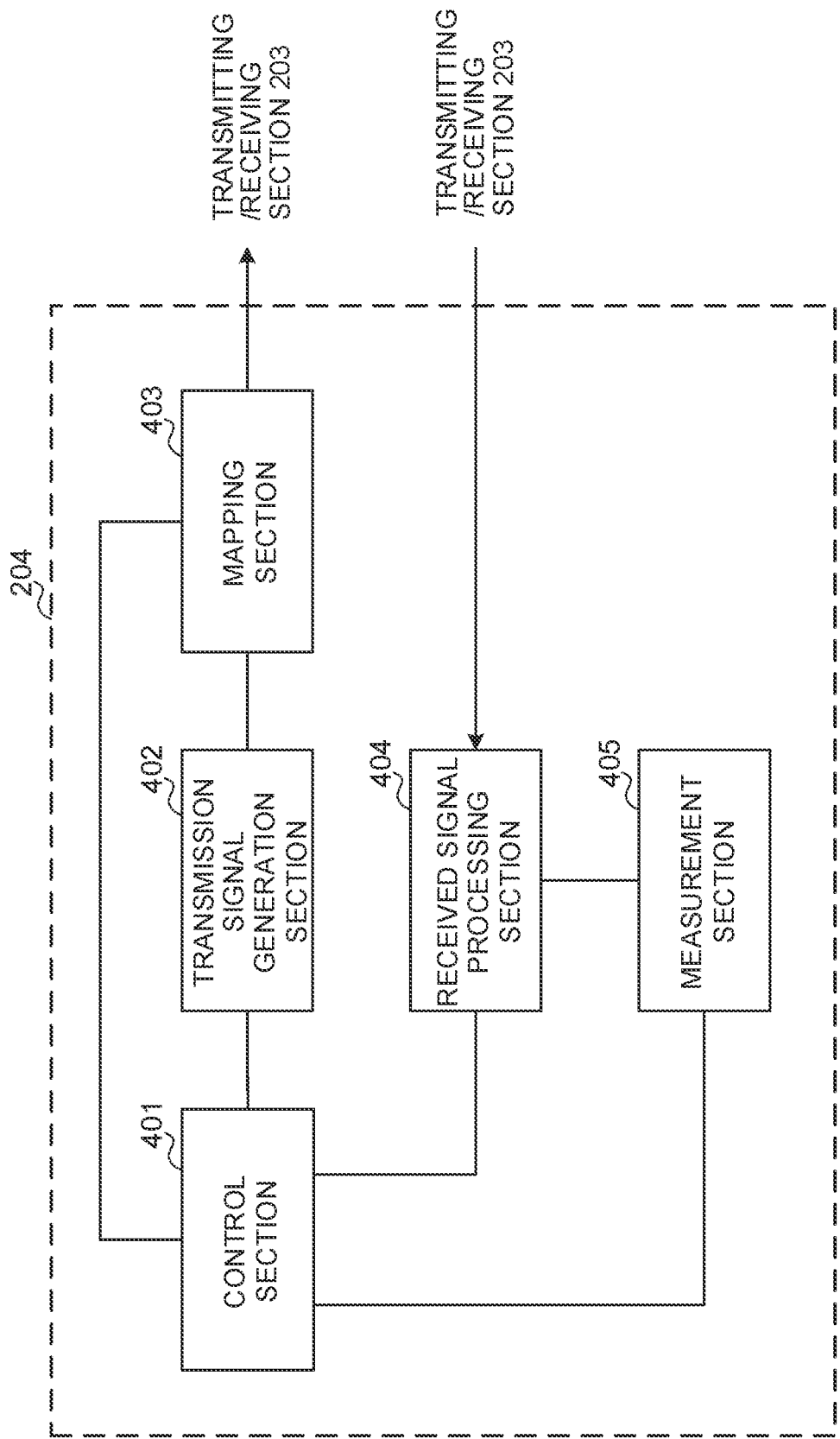
FIG. 10 is a diagram illustrating an example of a functional structure of the user terminal according to the present embodiment.

FIG. 10 is a diagram illustrating an example of a functional structure of a user terminal according to the present embodiment. Note that, although this example will primarily show functional blocks that pertain to characteristic parts of the present embodiment, it may be assumed that the user terminals 20 have other functional blocks that are necessary for radio communication as well.

The baseband signal processing section 204 provided in the user terminal 20 at least includes the control section 401, a transmission signal generation section 402, a mapping section 403, a received signal processing section 404, and a measurement section 405. Note that these components have only to be included in the user terminal 20, and some or all of these components may not be included in the baseband signal processing section 204.

The control section 401 controls the whole of the user terminal 20. The control section 401 can be constituted by a controller, a control circuit, or a control apparatus that is described based on common understanding of the technical field according to the present disclosure.

The control section 401, for example, controls generation of the signal in the transmission signal generation section 402, the allocation of the signal in the mapping section 403, and so on. Furthermore, the control section 401 controls the signal receiving process in the received signal processing section 404, the measurement of the signal in the measurement section 405, and so on.

The control section 401 acquires the downlink control signal and the downlink data signal, which are transmitted from the radio base station 10, from the received signal processing section 404. The control section 401 controls generation of the uplink control signal and/or the uplink data signal based on results of determining whether retransmission control is necessary for the downlink control signal and/or the downlink data signal.

The control section 401 may use digital BF (for example, precoding) by the baseband signal processing section 204 and/or analog BF (for example, phase rotation) by the transmitting/receiving sections 203 to perform control of forming a transmission beam and/or a reception beam.

The control section 401 may control the monitoring of the downlink shared channel in the time domain resource and the frequency domain resource of the cycle configured by higher layer signaling (first aspect, the types 1 and 2).

The time domain resource and the frequency domain resource may be configured in the user terminal 20 by the higher layer signaling (first aspect, the type 1).

The time domain resource and the frequency domain resource may be designated to the user terminal by downlink control information indicating that transmission of the downlink shared channel in the cycle is activated (first aspect, the type 2).

When receiving downlink control information to which a cyclic redundancy check (CRC) bit scrambled by a specific identifier is added, the control section 401 may control reception of the retransmitted downlink shared channel based on the downlink control information (first aspect).

When the downlink shared channel is received based on the first downlink control information detected in the monitoring period of the given cycle, the control section 401 may control reception of the downlink shared channel scheduled by the next monitoring period based on the second downlink control information transmitted as a MAC control element via the downlink shared channel, or piggybacked on the downlink shared channel (first aspect, the type 3).

When one piece of downlink control information detected in the monitoring period of a given cycle is received, the control section 401 may control reception of the downlink shared channel based on the information about the downlink shared channel included in the one piece of downlink control information, and may control transmission of the uplink shared channel based on the information about the uplink shared channel included in the one piece of downlink control information (second aspect).

The transmission signal generation section 402 generates uplink signals (uplink control signal, uplink data signal, uplink reference signals, etc.) based on the instruction from the control section 401 to output these signals to the mapping section 403. The transmission signal generation section 402 can be constituted by a signal generator, a signal generating circuit, or a signal generating apparatus, which is described based on common understanding of the technical field according to the present disclosure.

For example, the transmission signal generation section 402 generates the uplink control signal related to delivery acknowledgement information, channel state information (CSI), and so on based on the instruction from the control section 401. Also, the transmission signal generation section 402 generates the uplink data signal based on the instruction from the control section 401. For example, when the UL grant is included in the downlink control signal notification of which is provided from the radio base station 10, the transmission signal generation section 402 is instructed by the control section 401 to generate the uplink data signal.

The mapping section 403 maps the uplink signal generated in the transmission signal generation section 402 to the radio resource based on the instruction from the control section 401 to output the result to the transmitting/receiving section 203. The mapping section 403 can be constituted by a mapper, a mapping circuit, or a mapping apparatus, which is described based on common understanding in the technical field according to the present disclosure.

The received signal processing section 404 performs the receiving process (for example, demapping, demodulation, decoding, and the like) on the received signal input from the transmitting/receiving section 203. Here, the received signal includes, for example, downlink signals (downlink control signal, downlink data signal, downlink reference signal, and so on) that are transmitted from the radio base station 10. The received signal processing section 404 can be constituted by a signal processor, a signal processing circuit, or a signal processing apparatus that is described based on common understanding of the technical field according to the present disclosure. Also, the received signal processing section 404 can constitute the receiving section according to the present disclosure.

The received signal processing section 404 outputs the information that is decoded through the receiving process to the control section 401. The received signal processing section 404 outputs, for example, broadcast information, system information, RRC signaling, DCI, and so on, to the control section 401. Also, the received signal processing section 404 outputs the received signal and/or the signal after the receiving process to the measurement section 405.

The measurement section 405 conducts measurements with respect to the received signal. The measurement section 405 can be constituted by a measurer, a measurement circuit, or measurement apparatus that is described based on common understanding of the technical field according to the present disclosure.

For example, the measurement section 405 may perform the RRM measurement, the CSI measurement, and so on based on the received signal. The measurement section 405 may measure the received power (for example, RSRP), the received quality (for example, RSRQ, SINR, SNR, etc.), the signal strength (for example, RSSI), transmission path information (for example, CSI), and so on. The measurement results may be output to the control section 401.

(Hardware Structure)

Note that the block diagram that has been used to describe the above embodiments illustrate blocks in functional units. These functional blocks (components) may be implemented in any combinations of hardware and/or software. Also, the method of implementing each functional block is not particularly limited. That is, each functional block may be implemented by one piece of apparatus that is physically and/or logically aggregated, or may be implemented by directly and/or indirectly connecting two or more physically and/or logically separate pieces of apparatus (via wire or wireless, for example) and using the plurality of apparatuses.

Figure 11:
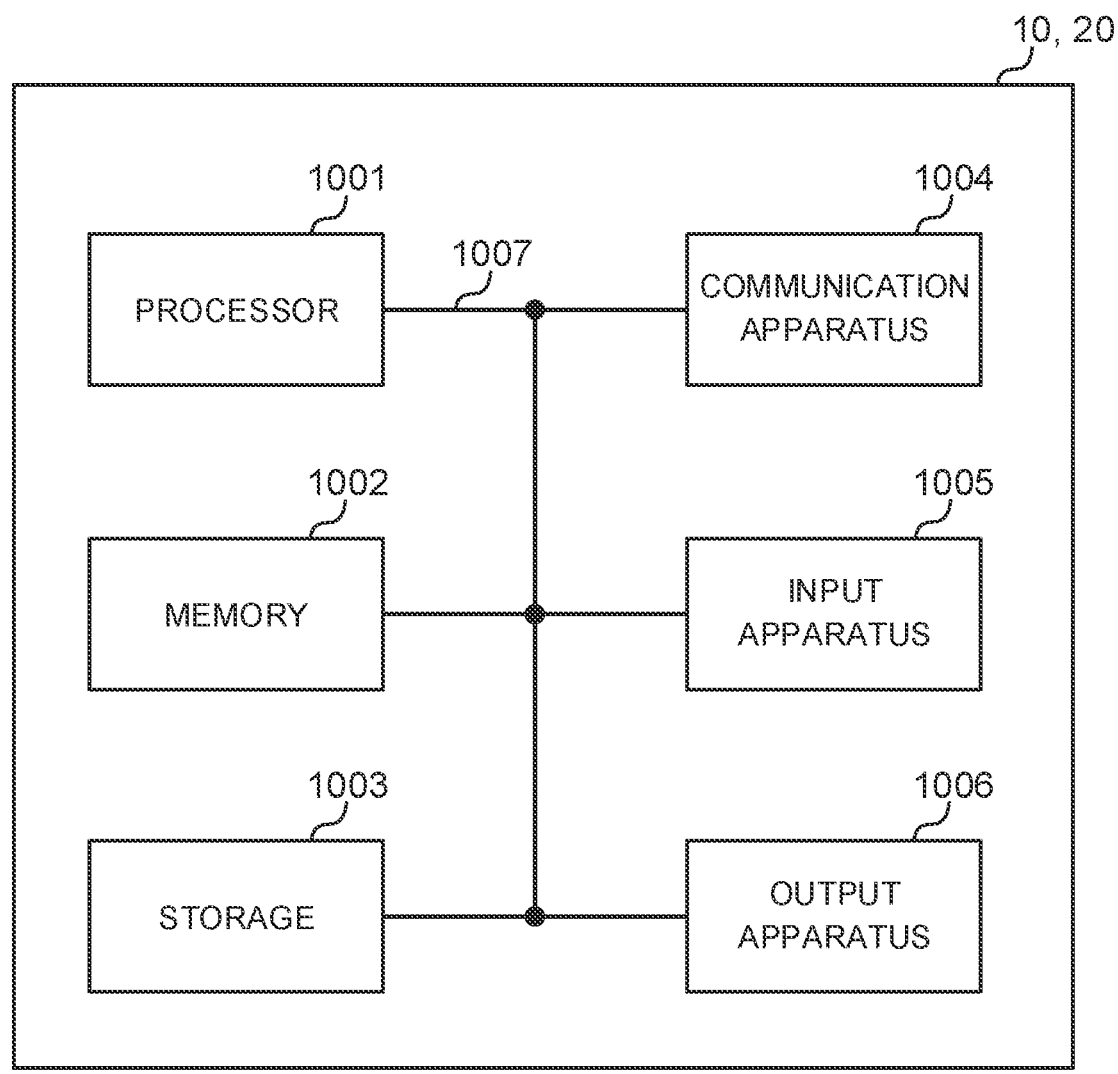
FIG. 11 is a diagram illustrating an example of a hardware structure of the radio base station and the user terminal according to the present embodiment.

For example, the radio base station, user terminals, and so on according to the present embodiment may function as a computer that executes the process of each aspect of the present embodiment. FIG. 11 is a diagram to show an example of a hardware structure of the radio base station and the user terminal according to the present embodiment. Physically, the above-described radio base stations 10 and user terminals 20 may be formed as a computer apparatus that includes a processor 1001, a memory 1002, a storage 1003, a communication apparatus 1004, an input apparatus 1005, an output apparatus 1006, a bus 1007, and the like.

Note that, in the following description, the term "apparatus" may be replaced by circuit, device, unit, and so on. The hardware configuration of each of the radio base station 10 and the user terminal 20 may be composed so as to include one or a plurality of apparatuses illustrated in the drawing, or may be composed so as not to include some of the apparatuses.

For example, although only one processor 1001 is illustrated, a plurality of processors may be provided. Furthermore, the processing may be executed by one processor, or the processing may be executed in sequence or in different manners by one or more processors. Note that the processor 1001 may have one or more chips.

Each function of the radio base station 10 and the user terminal 20 is implemented by the processor 1001 performing computation to control communication via the communication apparatus 1004, and control reading and/or writing of data in the memory 1002 and the storage 1003 by reading given software (program) on hardware such as the processor 1001 and the memory 1002.

The processor 1001 may control the whole computer by, for example, running an operating system. The processor 1001 may be composed of a central processing unit (CPU), which includes interfaces with peripheral apparatuses, a control apparatus, a computing apparatus, a register, and the like. For example, functions of the baseband signal processing section 104 (204), the call processing section 105, and the like, which are mentioned above, may be implemented by the processor 1001.

Furthermore, the processor 1001 reads programs (program codes), software modules, and data from the storage 1003 and/or the communication apparatus 1004 into the memory 1002, and executes various processes according to these. As for the programs, programs to allow the computer to execute at least some of the operations described in the above embodiment may be used. For example, the function of the control section 401 of the user terminal 20 may be implemented by a control program that is stored in the memory 1002 and operates in the processor 1001, and other functional blocks may be implemented in the same manner.

The memory 1002 is a computer-readable recording medium, and may be constituted by, for example, at least one of a read only memory (ROM), an erasable programmable ROM (EPROM), an electrically EPROM (EEPROM), a random access memory (RAM), and/or other appropriate storage media. The memory 1002 may be referred to as a register, a cache, a main memory (primary storage apparatus), or the like. The memory 1002 can store executable programs (program codes), software modules, and/or the like for implementing the radio communication methods according to the present embodiment.

The storage 1003 is a computer-readable recording medium, and for example, may be composed of at least one of a flexible disk, a floppy (registered trademark) disk, a magneto-optical disk (for example, a compact disc (compact disc ROM (CD-ROM) and the like), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as an auxiliary storage apparatus.

The communication apparatus 1004 is hardware (transmitting/receiving device) for allowing inter-computer communication by using wired and/or wireless networks, and may be referred to as, for example, a network device, a network controller, a network card, a communication module, and so on. The communication apparatus 1004 may be configured to include a high frequency switch, a duplexer, a filter, a frequency synthesizer, and so on in order to implement, for example, frequency division duplex (FDD) and/or time division duplex (TDD). For example, functions of the transmitting/receiving antenna 101 (201), the amplifying section 102 (202), the transmitting/receiving section 103 (203), the communication path interface 106, and the like, which are mentioned above, may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that performs output to the outside (for example, a display, a speaker, a light emitting diode (LED) lamp, and so on). The input apparatus 1005 and the output apparatus 1006 may have an integrated configuration (for example, a touch panel).

Furthermore, these apparatuses including the processor 1001, the memory 1002, and so on are connected by the bus 1007 so as to communicate information. The bus 1007 may be composed using a single bus, or may be composed using buses different between the apparatuses.

Also, the radio base station 10 and the user terminal 20 may be configured to include hardware such as a microprocessor, a digital signal processor (DSP), an application-specific integrated circuit (ASIC), a programmable logic device (PLD), and a field programmable gate array (FPGA), and all or some of the functional blocks may be implemented by the hardware. For example, the function of the processor 1001 may be implemented by at least one of these pieces of hardware.

(Modifications)

Note that the terminology used in this specification and the terminology that is needed to understand this specification may be replaced by other terms that convey the same or similar meanings. For example, channels and/or symbols may be replaced by signals (signaling). Also, the signal may be a message. A reference signal may be abbreviated as a reference signal (RS), and may be referred to as a pilot, a pilot signal, or the like, depending on which standard applies. Furthermore, a component carrier (CC) may be referred to as a cell, a frequency carrier, a carrier frequency, or the like.

Furthermore, a radio frame may be composed of one or a plurality of periods (frames) in the time domain. Each of one or a plurality of periods (frames) constituting the radio frame may be referred to as a subframe. Furthermore, the subframe may be composed of one or a plurality of slots in the time domain. A subframe may be a fixed time length (for example, 1 ms) not dependent on the numerology.

Furthermore, the slot may be composed of one or a plurality of symbols (orthogonal frequency division multiplexing (OFDM) symbol, single carrier frequency division multiple access (SC-FDMA) symbol, and so on) in the time domain. Also, the slot may be a time unit based on numerology. Also, the slot may include a plurality of mini-slots. Each mini-slot may be composed of one or a plurality of symbols in the time domain. Also, the mini-slot may be referred to as a sub-slot.

Each of the radio frame, the subframe, the slot, the mini-slot, and the symbol represents a time unit at the time of transmitting a signal. The radio frame, the subframe, the slot, the mini-slot, and the symbol may be referred to as respective different names corresponding to them. For example, one subframe may be referred to as a transmission time interval (TTI), or a plurality of consecutive subframes may be referred to as the TTI, or one slot or one mini-slot may be referred to as the TTI. That is, the subframe and/or the TTI may be a subframe (1 ms) in existing LTE, may be a period shorter than 1 ms (for example, one to thirteen symbols), or may be a period longer than 1 ms. Note that the unit to represent the TTI may be referred to as a slot, a mini slot, or the like instead of a subframe.

Here, the TTI refers to the minimum time unit of scheduling in radio communication, for example. For example, in the LTE system, the radio base station performs scheduling to allocate the radio resource (frequency bandwidth and transmission power that can be used in each user terminal, and the like) to each user terminal on a TTI basis. Note that the definition of TTIs is not limited thereto.

The TTI may be the transmission time unit of the channel-encoded data packet (transport block), the code block, and/or the codeword, or may be the unit of processing in scheduling, link adaptation, and so on. Note that when the TTI is given, the period of time (for example, the number of symbols) in which transport blocks, code blocks, and/or codewords are actually mapped may be shorter than the TTI.

Note that, when one slot or one mini-slot is referred to as a TTI, one or more TTIs (that is, one or more slots or one or more mini-slots) may be the minimum time unit of scheduling. Moreover, the number of slots (the number of mini-slots) which constitute the minimum time unit of the scheduling may be controlled.

The TTI having a time length of 1 ms may be referred to as a usual TTI (TTI in LTE Rel. 8 to 12), a normal TTI, a long TTI, a usual subframe, a normal subframe, a long subframe, or the like. The TTI that is shorter than the usual TTI may be referred to as a shortened TTI, a short TTI, a partial TTI (partial or fractional TTI), a shortened subframe, a short subframe, a mini-slot, a sub-slot, or the like.

Note that the long TTI (for example, a normal TTI, a subframe, etc.) may be replaced by a TTI having a time length exceeding 1 ms, and the short TTI (for example, a shortened TTI) may be replaced by a TTI having a TTI length less than the TTI length of the long TTI and not less than 1 ms.

The resource block (RB) is the unit of resource allocation in the time domain and the frequency domain, and may include one or a plurality of consecutive subcarriers in the frequency domain. Also, the RB may include one or a plurality of symbols in the time domain, and may be one slot, one mini-slot, one subframe, or one TTI in length. One TTI and one subframe may be each composed of one or a plurality of resource blocks. Note that one or a plurality of RBs may be referred to as a physical resource block (physical RB (PRB)), a subcarrier group (SCG), a resource element group (REG), a PRB pair, an RB pair, or the like.

Furthermore, the resource block may be composed of one or a plurality of resource elements (REs). For example, one RE may be a radio resource region of one subcarrier and one symbol.

Note that the configurations of the radio frame, the subframe, the slot, the mini-slot, the symbol, and the like described above are merely examples. For example, configurations pertaining to the number of subframes included in a radio frame, the number of slots per a subframe or a radio frame, the number of mini-slots included in a slot, the number of symbols and RBs included in a slot or a mini-slot, the number of subcarriers included in an RB, the number of symbols in a TTI, the symbol length, the cyclic prefix (CP) length, and the like can be variously changed.

Also, the information and parameters described in this specification may be represented in absolute values or in relative values with respect to given values, or may be represented using different information corresponding to them. For example, the radio resource may be specified by a given index.

The names used for parameters and so on in this specification are in no respect limiting. For example, since various channels (physical uplink control channel (PUCCH), physical downlink control channel (PDCCH), and so on) and information elements can be identified by any suitable names, the various names assigned to these individual channels and information elements are in no respect limiting.

The information, signals and/or others described in this specification may be represented by using any of a variety of different technologies. For example, data, instructions, commands, information, signals, bits, symbols, chips, and the like that may be referenced throughout the above description may be represented by voltages, currents, electromagnetic waves, magnetic fields or particles, optical fields or photons, or any combinations of these.

Also, information, signals, and so on may be output from higher layers to lower layers and/or from lower layers to higher layers. Information, signals, and the like may be input and output via a plurality of network nodes.

The information, signals, and so on that are input and/or output may be stored in a specific location (for example, in a memory), or may be managed in a control table. The information, signals, and so on to be input and/or output can be overwritten, updated, or appended. The information, signals, and the like that are output may be deleted. The information, signals, and the like which are input may be transmitted to other apparatuses.

Notification of information is not limited to the aspects/embodiments described in this specification, but other methods may be used as well. For example, notification of information may be implemented by physical layer signaling (for example, downlink control information (DCI), uplink control information (UCI)), higher layer signaling (for example, radio resource control (RRC) signaling, broadcast information (master information block (MIB), system information block (SIB), and the like), and medium access control (MAC) signaling), other signals or combinations of these.

Note that physical layer signaling may be referred to as Layer 1/Layer 2 (L1/L2) control information (L1/L2 control signal), L1 control information (L1 control signal), or the like. Also, RRC signaling may be referred to as an RRC message, and can be, for example, an RRC connection setup (RRCConnectionSetup) message, an RRC connection reconfiguration (RRCConnectionReconfiguration) message, and so on. Moreover, notification of MAC signaling may be provided using, for example, the MAC control element (MAC CE).

Further, notification of given information (for example, notification of information to the effect that "X holds") may be not only sent explicitly, but also sent implicitly (for example, by not making notification of the given information, or by making notification of another piece of information).

The determination may be made by the value (0 or 1) represented by one bit, may be made by the Boolean value that represents true or false, or may be made by comparing numerical values (for example, comparison against a given value).

Software, whether referred to as software, firmware, middleware, microcode, or hardware description language, or referred to by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via transmission media. For example, when software is transmitted from a website, a server, or other remote sources by using wired technologies (coaxial cables, optical fiber cables, twisted-pair cables, digital subscriber lines (DSLs), and so on) and/or wireless technologies (infrared radiation, microwaves, and so on), these wired technologies and/or wireless technologies are also included in the definition of transmission media.

The terms "system" and "network" as used herein are used interchangeably.

As used herein, the terms "base station (BS)", "radio base station", "eNB", "gNB", "cell", "sector", "cell group", "carrier", and "component carrier" may be used interchangeably. The base station may be referred to by terms such as a fixed station, a NodeB, an eNodeB (eNB), an access point, a transmission point, a receiving point, a femto cell, a small cell, or the like.

The base station can accommodate one or a plurality of (for example, three) cells (also referred to as sectors). When the base station accommodates a plurality of cells, the entire coverage area of the base station can be partitioned into a plurality of smaller areas, and each smaller area can provide the communication service through the base station subsystem (for example, indoor small base station (remote radio head (RRH))). The term "cell" or "sector" refers to part or the entirety of the coverage area of the base station and/or the base station subsystem that provides the communication service within this coverage.

As used herein, the terms "mobile station (MS)" "user terminal", "user equipment (UE)", and "terminal" may be used interchangeably.

The mobile station may be referred to, by a person skilled in the art, by terms such as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

Furthermore, the radio base stations in this specification may be interpreted as the user terminal. For example, each aspect/embodiment of the present disclosure may be applied to a configuration in which communication between a radio base station and a user terminal is replaced by communication among a plurality of user terminals (device-to-device (D2D)). In this case, the user terminal 20 may have the functions of the radio base station 10 described above. In addition, terms such as "uplink" and "downlink" may be interpreted as "side". For example, an uplink channel may be interpreted as a side channel.

Likewise, the user terminal in this specification may be interpreted as the radio base station. In this case, the radio base station 10 may have the functions of the user terminal 20 described above.

Certain actions which have been described in this specification to be performed by the base station may, in some cases, be performed by their upper nodes. In a network including one or a plurality of network nodes with base stations, it is clear that various operations that are performed so as to communicate with terminals can be performed by the base station, one or more network nodes (for example, mobility management entities (MMEs), serving-gateways (S-GWs), and so on may be conceivable, but they are not limited to these) other than the base station, or combinations of these.

The aspects/embodiments illustrated in this specification may be used individually or in combinations, or they may be switched depending on the mode of implementation. The order of processes, sequences, flowcharts, and so on that have been used to describe the aspects/embodiments herein may be re-ordered as long as inconsistencies do not arise. For example, although various methods that have been illustrated in this specification provide various elements of steps in exemplary orders, the specific orders that are illustrated herein are not limiting.

The aspects/embodiments illustrated in this specification may be applied to a long term evolution (LTE), an LTE- Advanced (LTE-A), an LTE-Beyond (LTE-B), a SUPER 3G, an IMT-Advanced, a 4th generation mobile communication system (4G), a 5th generation mobile communication system (5G), a future radio access (FRA), a radio access technology (New-RAT), a new radio (NR), a new radio access (NX), a future generation radio access (FX), a global system for mobile communications (GSM) (registered trademark), a CDMA 2000, an ultra mobile broadband (UMB), an IEEE 802.11 (Wi-Fi (registered trademark)), an IEEE 802.16 (WiMAX (registered trademark)), an IEEE 802.20, an ultra-wideband (UWB), a Bluetooth (registered trademark), systems that use other adequate radio communication methods and/or next-generation systems that are enhanced based on these.

The phrase "based on" as used in this specification does not mean "based only on", unless otherwise specified. In other words, the phrase "based on" means both "based only on" and "based at least on".

Reference to elements with designations such as "first", "second", and so on as used herein does not generally limit the number/quantity or order of these elements. These designations may be used herein only for convenience, as a method of distinguishing between two or more elements. Hence, references of first and second elements do not mean that only two elements are adoptable, or that the first element must precede the second element in some way.

The terms "judge (determine)" as used herein may encompass a wide variety of actions. For example, to "judge (determine)" as used herein may be interpreted to mean making "judgement (determination)" related to calculating, computing, processing, deriving, investigating, looking up (for example, searching a table, a database, or some other data structure), ascertaining, and so on. Furthermore, to "judge (determine)" as used herein may be interpreted to mean making "judgement (determination)" related to receiving (for example, receiving information), transmitting (for example, transmitting information), inputting, outputting, accessing (for example, accessing data in a memory), and so on. In addition, to "judge (determine)" as used herein may be interpreted to mean making "judgement (determination)" related to resolving, selecting, choosing, establishing, comparing, and so on. In other words, to "judge (determine)" as used in the present disclosure may be interpreted to mean making "judgement (determination)" related to some action.

As used herein, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be interpreted as "access".

As used herein, when two elements are connected, these elements may be considered "connected" or "coupled" to each other by using one or more electrical wires, cables, and/or printed electrical connections, and, as a number of non-limiting and non-inclusive examples, by using electromagnetic energy, such as electromagnetic energy having wavelengths in the radio frequency, microwave, and optical (both visible and invisible) regions.

In the present specification, the phrase "A and B are different" may mean "A and B are different from each other". The terms such as "leave", "coupled", and the like may be interpreted similarly.

When terms such as "including", "comprising", and variations of these are used in this specification or in claims, these terms are intended to be inclusive, in a manner similar to the way the term "providing" is used. Furthermore, the term "or" as used in this specification or in claims is intended to be not an exclusive disjunction.

Now, although the invention according to the present disclosure is described in detail above, it should be obvious to a person skilled in the art that the invention according to the present disclosure is not limited to the embodiments described herein. The invention according to the present disclosure can be implemented with various corrections and in various modifications, without departing from the spirit and scope of the invention defined by the recitations of claims. Consequently, the description herein is provided only for the purpose of explaining examples, and should not be construed to limit the invention according to the present disclosure in any way.

The invention claimed is:

1. A terminal comprising:
a receiver that receives a physical downlink shared channel (PDSCH), which is transmitted in period configured by a higher layer parameter, and a downlink control information (DCI); and
a processor that performs a control to transmit an ACK at least when the DCI indicates deactivation of the PDSCH, and to transmit a NACK when the PDSCH is unsuccessfully decoded.

2. The terminal according to claim 1, wherein the processor controls reception of the PDSCH based on retransmission information indicated by the DCI.

3. The terminal according to claim 1, wherein the processor controls reception of the PDSCH based on hybrid automatic repeat request (HARQ) process number information configured by the higher layer parameter.

4. The terminal according to claim 2, wherein the processor controls reception of the PDSCH based on hybrid automatic repeat request (HARQ) process number information configured by the higher layer parameter.

5. The terminal according to claim 1, wherein the DCI is cyclic redundancy check (CRC) scrambled with a given identifier.

6. The terminal according to claim 2, wherein the DCI is cyclic redundancy check (CRC) scrambled with a given identifier.

7. The terminal according to claim 3, wherein the DCI is cyclic redundancy check (CRC) scrambled with a given identifier.

8. The terminal according to claim 1, wherein the DCI is DCI format 1_0.

9. The terminal according to claim 2, wherein the DCI is DCI format 1_0.

10. The terminal according to claim 3, wherein the DCI is DCI format 1_0.

11. The terminal according to claim 5, wherein the DCI is DCI format 1_0.

12. A radio communication method comprising:
receiving a physical downlink shared channel (PDSCH), which is transmitted in period configured by a higher layer parameter, and a downlink control information (DCI); and
performing a control to transmit an ACK at least when the DCI indicates deactivation of the PDSCH, and to transmit a NACK when the PDSCH is unsuccessfully decoded.

13. A base station comprising:
a transmitter that transmits a physical downlink shared channel (PDSCH), which is transmitted in period configured by a higher layer parameter, and a downlink control information (DCI); and a processor that performs a control to receive an ACK at least when the DCI indicates deactivation of the PDSCH, and to receive a NACK when the PDSCH is unsuccessfully decoded by the terminal.

14. A system comprising a terminal and a base station, wherein:

the terminal comprises:

a receiver that receives a physical downlink shared channel (PDSCH), which is transmitted in period configured by a higher layer parameter, and a downlink control information (DCI); and a processor that performs a control to transmit an ACK at least when the DCI indicates deactivation of the PDSCH, and to transmit a NACK when the PDSCH is unsuccessfully decoded; and the base station comprises:

a transmitter that transmits the physical downlink shared channel (PDSCH), which is transmitted in period configured by the higher layer parameter, and the downlink control information (DCI); and a processor that performs a control to receive an ACK at least when the DCI indicates deactivation of the PDSCH, and to receive a NACK when the PDSCH is unsuccessfully decoded by the terminal.

\* \* \* \* \*